US005528002A

United States Patent [19]

Katabami

[11] Patent Number: 5,528,002
[45] Date of Patent: Jun. 18, 1996

[54] NOISEPROOF DIGITIZING APPARATUS WITH LOW POWER CORDLESS PEN

[75] Inventor: Koichiro Katabami, Ibaraki, Japan

[73] Assignee: Pentel Kabushiki Kaisha, Japan

[21] Appl. No.: 273,632

[22] Filed: Jul. 12, 1994

[30] Foreign Application Priority Data

Jul. 15, 1993 [JP] Japan ................................. 5-197966
Dec. 28, 1993 [JP] Japan ................................. 5-352081
Feb. 28, 1994 [JP] Japan ................................. 6-055115

[51] Int. Cl.$^6$ .......................... G08C 21/00; G09G 3/02
[52] U.S. Cl. .......................... 178/18; 178/19; 178/20; 345/156; 345/179; 345/182
[58] Field of Search .............................. 178/18, 19, 20; 345/156, 179, 182

[56] References Cited

U.S. PATENT DOCUMENTS

| | | | |
|---|---|---|---|
| 4,217,649 | 8/1980 | Doundoulakis | 178/19 |
| 4,473,717 | 9/1984 | Parnell | 178/19 |
| 4,479,032 | 10/1984 | Parnell | 178/19 |
| 4,672,154 | 6/1987 | Rodgers | 178/19 |
| 5,072,076 | 12/1991 | Camp, Jr. | 178/18 |

Primary Examiner—Stephen Chin
Assistant Examiner—Vijay Shankar
Attorney, Agent, or Firm—Adams & Wilks

[57] ABSTRACT

A noiseproof digitizing apparatus for digitizing the coordinates of a point on a tablet having grid conductors disposed along X and Y coordinate axes includes a cordless pen having a conductive end for transmitting an electrical signal to the grid conductors through of electrostatic capacitive coupling. An AC signal generator generates an AC signal and applies a balanced output of the AC signal to the conductive end, such that electrostatic capacitive coupling between the conductive end and the grid conductors causes a major balanced AC signal component and two minor unbalanced AC signal components to be produced in the grid conductors in response to the AC signal on the conductive end. A power supply supplies electrical power to the AC signal generator. A signal level measuring device measures the level of a signal current resulting from a sum of the major balanced AC signal component and the two minor unbalanced AC signal components produced in the grid conductors. A processor is provided for processing the measured signal level to determine a coordinate of the conductive end of the cordless pen.

24 Claims, 11 Drawing Sheets

NOISEPROOF DIGITIZING APPARATUS WITH LOW POWER CORDLESS PEN

FIELD OF THE INVENTION

The present invention relates to a digitizing apparatus in which a cordless pen is placed in contact with a tablet, and positional information placed in contact with the tablet is outputted as a digital value. More specifically, the present invention relates to a digitizing apparatus in which a balanced AC signal is transmitted from the cordless pen, and a coordinate is detected mainly from the intensity of a level of each balanced AC signal which is propagated to grid-like conductors positioned adjacent to each other in X and Y directions and embedded in the tablet by means of electrostatic capacity coupling.

BACKGROUND OF THE INVENTION

In the past, an electrostatic capacity coupling system has been proposed for a digitizing apparatus for a tablet using a cordless pen. According to this system, an active circuit including a battery is encased in a pen, an unbalanced AC signal is transmitted, and a coordinate is detected from the intensity of a single ended AC signal received by grid conductors within the tablet through a capacity coupling. One example of such a system as described is disclosed in U.S. Pat. No. 4,672,154 issued to James L. Rodgers on Jun. 9, 1987, which makes use of a virtual ground shield. In such an electrostatic capacity coupling system as described, since the unbalanced signal is transmitted, foreign noises are often mixed, the S/N ratio of signals is poor, and a relatively intense AC signal is transmitted from the pen, thus increasing the number of batteries used in the pen and accordingly increasing power consumption. Further, the pen is heavy and the construction of the tablet conductors is also complicated.

There has been known a further apparatus using an electromagnetic coupling system in which only a resonance circuit which is a passive circuit is contained in a pen. In this system, when a metal, such as a metal ring worn by an operator, is placed in contact with the tablet, erroneous operations tend to occur. Further, when this system is combined with a TFT color liquid crystal display for use, erroneous operations also occur due to interference.

SUMMARY OF THE INVENTION

A principal object of the present invention is to provide a digitizing apparatus of an electrostatic capacity coupling system employing a cordless pen which greatly strengthens the ability for excluding foreign noises and greatly reduces a power consumption within the cordless pen, has an excellent S/N ratio and is highly precise.

A signal transmitting system according to the present invention comprises a balanced signal transmitting system through an electrostatic capacity coupling which essentially requires no return route of a signal owing to a virtual ground shield.

An AC signal is generated within the cordless pen, and a balanced output thereof is applied to two conductors (for example, a stylus conductor and a ring-like conductor which encircles the former) at an extreme end of the cordless pen. These two conductors at the extreme end of the cordless pen, when the extreme end of the pen is present in the vicinity of a plate surface of a digitizing tablet, are subjected to electrostatic capacity coupling with adjacent grid-like conductors embedded in the tablet. Accordingly, the balanced signal output from the pen is transmitted in the pseudo balanced form to the adjacent grid conductors according to the magnitude of the coupling capacity. That is, since the respective coupling capacities are not always equal to each other, the pseudo balanced transmission results.

Since the grid conductors are set to a low impedance, the AC signal is received as a current into an amplifier. Since the AC voltage of the grid conductors is almost zero, the stray capacity in connection therewith is hardly charged or discharged, thus greatly reducing a loss of signals.

An input section of an amplifier comprises a balanced type current buffer amplifier which is extremely low in input impedance, and a buffered current is applied to a balance-to-unbalance translator having the function of a band pass filter. Since here the signal transmitting route is of a balance type of a pseudo balance type, a clean signal which has a very strong durability against the entry of foreign noises and which is excellent in S/N ratio can be transmitted. Due to the presence of the aforesaid characteristics, there can be provided a sufficiently practical coordinate detecting apparatus even if a signal generating level is made extremely low and a power consumption in the cordless pen is made less than $1/10$ of that shown in the prior art.

Further, various techniques for supporting the above-described system have been developed as well. The pen has two switches, one of which is turned on when a pen stylus is pressed against the plate surface of the tablet, the other being a side switch to be pressed by a finger of an operator. The AC signal frequency caused by a ceramic oscillator is finely changed in four ways with respect to a combination of four statuses of these switches. Accordingly, a very narrow frequency band is used which also contributes to improve the S/N ratio.

In decoding the statuses of the aforementioned two switches, frequencies of received signals are calculated. Squarewaves which are $1/2$ the frequency of the received signals are generated, and the squarewaves are digitally counted to decode the aforementioned two switch statuses. By the provision of the aforementioned means, unnecessary feedbacks which cause system instability from a digital section to front stages of the amplifier are considerably reduced, and the shield need not be applied although a total gain of the amplifier close to 100 dB is obtained, thus obtaining a stable operation.

Further, in amplitude-measuring a signal level, the signal and a near-squarewave synchronized in phase with the signal are superimposed, thereby greatly improving the linearity of a transistor AM envelope detector. Moreover, a drift resulting from various causes at the time of non-signal in the amplitude detection stage is automatically canceled.

A unique interpolation between adjacent grid conductors has also been developed in which during determination of a coordinate on the tablet of the cordless pen, levels of signals propagated from the cordless pen are measured with respect to each of the adjacent grid conductors. Unlike the conventional single end (unbalanced) signal transmission system, the signal level detection characteristic peculiar to the balanced signal can be provided. This is a highly accurate interpolation specialized for a large tablet and for a small tablet, according to a relatively simple computation formula using a normalized level.

A low power, high output voltage circuit has been developed which is different in an AC signal generating circuit within a cordless pen for use between a large tablet and a small tablet. However, the construction of two conductors at the extreme end of the pen for transmitting a signal to the grid conductors in the tablet is the same.

For the large tablet, a squarewave oscillation caused by a CMOS inverter defined in frequency by an electromechanical ceramic resonator is provided, and normal phase and reverse phase voltages are applied in balance to two conductors at the extreme end of the cordless pen to thereby output a balanced voltage of a peak-to-peak fundamental wave component 2.5 times or more that of a supply voltage.

For a small tablet, the ceramic resonator is likewise used. A sinewave is oscillated by a single transistor for C-class operation, and a pseudo balanced output voltage of about 5 Vpp is generated by a consuming current of 100 micro A or less from a single 1.55 V button cell.

From the above-described synthetic effect, any type of low power cordless pen, or even a digitizing tablet using resistive transparent grid conductors, can be superposed on a color TFT liquid crystal display for use to digitize a fully stable pen coordinate. Further, even if a metal, such as a finger metal ring, comes close to a surface of the tablet, the apparatus is not affected thereby.

The construction of the tablet conductors is also simple and is readily manufactured, enabling the cost of the tablet to be reduced. Further, since the power consumption by the cordless pen is very low, a power feeding to the cordless pen by mutual inductance coupling is also realized. The same is true for a supply of power to the cordless pen with a solar battery.

Figure 1A:
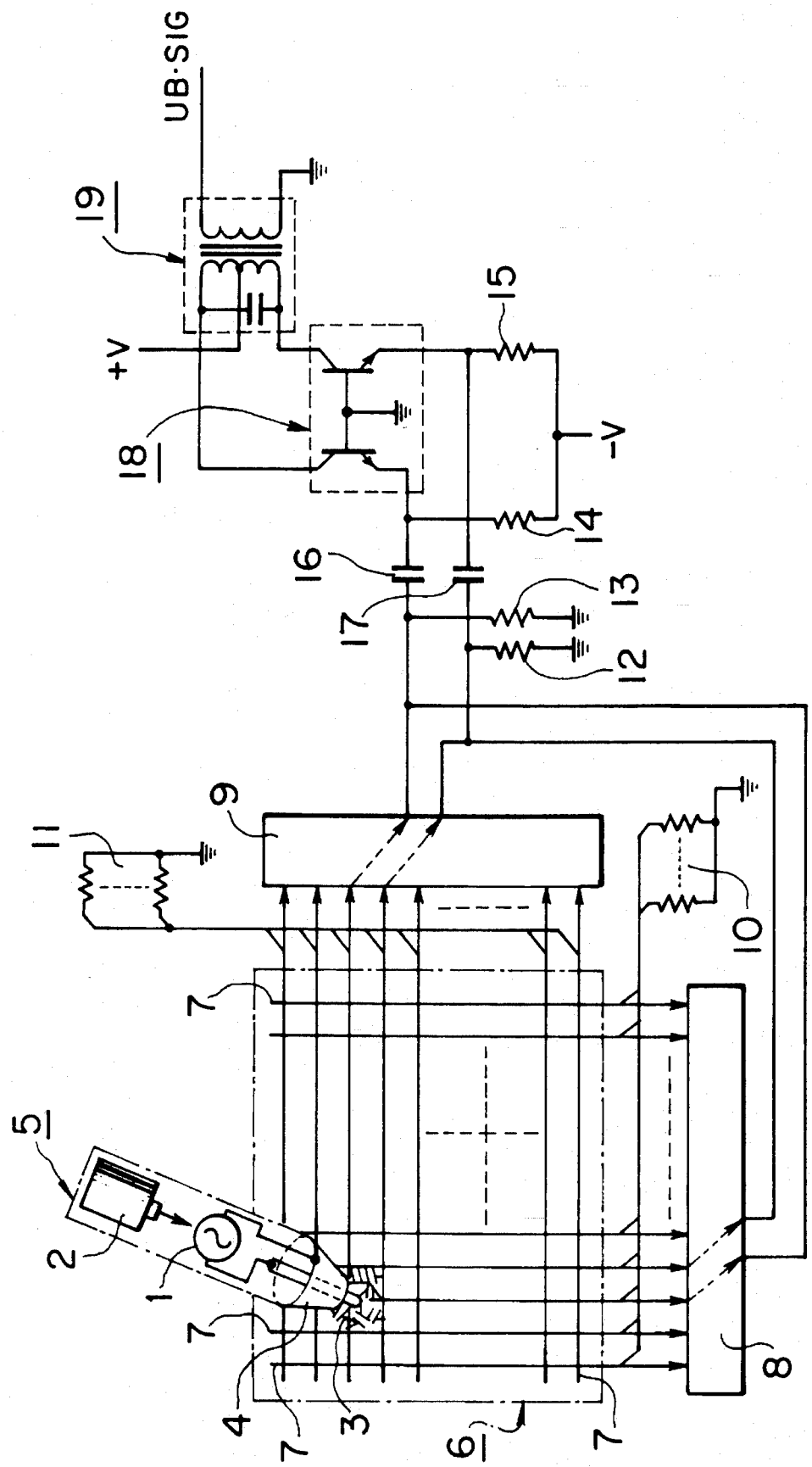
FIGS. 1A and 1B are structural views of the entire apparatus according to one embodiment of a noiseproof digitizing apparatus with a low power consumption cordless pen in accordance with the present invention.

In the drawings, the reference numerals represent the following elements:

1 Balanced sinewave or squarewave generator
2 Battery
3 Stylus conductor at an extreme end of the cordless pen
4 Ring-like conductor at the extreme end of the cordless pen
5 Cordless pen
6 Tablet
7 Grid conductor
8 Analog multiplexer in X direction
9 Analog multiplexer in Y direction
10 DC level fixing resistor (e.g. 1 to 10k ohm)
11 DC level fixing resistor (e.g. 1 to 10k ohm)
12 DC level fixing resistor (e.g. 47k ohm)
13 DC level fixing resistor (e.g. 47k ohm)
14 DC current sinking resistor (e.g. 4.7k ohm)
15 DC current sinking resistor (e.g. 4.7k ohm)
16 AC coupling capacitor (e.g. 0.022 micro F)
17 AC coupling capacitor (e.g. 0.022 micro F)
18 Balanced current buffer amplifier
19 Balance-to-unbalance translator with a band pass filter
20 Amplifier
21 Input impedance of an amplifier 20 (e.g. 45k ohm)
22 Impedance increasing resistor (e.g. 6.8k ohm)
23 Filter capacitor
24 Filter coil
25 Q damping resistor (e.g. 2.7k ohm)
26 Gain variable resistor (e.g. 470 ohm)
27 Gain variable resistor (e.g. 1.5k ohm)
28 Switch
29 Switch
30 Switch
31 Limiting amplifier
32 Phase inverting amplifier
33 Impedance increasing resistor (e.g. 1k ohm)
34 Superimpose resistor (e.g. 68k ohm)
35 Detector transistor
36 CMOS Schmidt inverter
37 Charge and discharge timing capacitor (e.g. 15 pF)
38 Feedback resistor (e.g. 150k ohm)
39 Resistor (e.g. 100k ohm)
40 Capacitor (e.g. 0.1 micro F)
41 D type flip-flop
42 Current sinking resistor (e.g. 220k ohm)
43 Detector capacitor (e.g. 1000 pF)
44 Switch
45 Low pass filter resistor (e.g. 22k ohm)
46 Low pass filter capacitor (e.g. 220 pF)
47 Low pass filter resistor (e.g. 47k ohm)
48 Sample/hold capacitor (e.g. 1000 p)
49 Operational amplifier
50 Operational amplifier
51 Operational amplifier
52 Operational resistor (e.g. 1.2k ohm)
53 Operational resistor (e.g. 1.2k ohm)
54 Operational resistor (e.g. 10k ohm)
55 A/D converter
56 Control section
57 Phase synchronizing oscillator
60 Power supply switch
61 CMOS inverter
62 CMOS inverter
63 DC feedback resistor
64 Output resistor 65 Output resistor
66 Resonator driving resistor
67 Electromechanical ceramic resonator (e.g. 455 kHz)
68 Resonance dividing capacitor
69 Resonance dividing capacitor
70 Frequency shift capacitor
71 Frequency shift capacitor
72 Side switch
73 Stylus pressure sensitive switch
74 Schottky-Barrier device
75 Transistor
76 Emitter resistor (e.g. 10 to 100 ohm)
77 Output resonance coil
78 Output resonance capacitor
79 Base resistor (e.g. 1k ohm)
80 DC bias applying resistor (e.g. 200k ohm to 3M ohm)
81 Electromechanical ceramic resonator driving resistor (e.g. 22k ohm)
82 Resonance dividing capacitor
83 Resonance dividing capacitor
84 Frequency shift capacitor
85 Frequency shift capacitor
86 DC level fixing resistor for capacitor 84 (e.g. 10M ohm)
87 Side switch
88 DC level fixing resistor for capacitor 85 (e.g. 10M ohm)
89 Stylus pressure sensitive switch
90 Surge current preventive resistor (e.g. 100 ohm)
91 Instantaneous power supply voltage stabilizing capacitor (e.g. 1 micro F)
92 Output voltage waveform
93 Collector voltage waveform of transistor
94 Positive side power supply voltage level
95 Base threshold level of transistor
96 Base voltage waveform of transistor
97 Negative side power supply voltage level
98 Collector current waveform of transistor
99 Current waveform of shot key barrier diode
100 stray capacity between stylus conductor 3 and ring-like conductor 4
101 Balanced diving output impedance of AC signal generator
102 Balanced diving output impedance of AC signal generator
103 Pseudo ground impedance of stylus conductor 3
104 Pseudo ground impedance of ring-like conductor 4
105 Coupling capacitor between stylus conductor 3 and grid conductor (n)
106 Coupling capacitor between stylus conductor 3 and grid conductor (n+1)
107 Coupling capacitor between ring-like conductor 4 and grid conductor (n)
108 Coupling capacitor between ring-like conductor 4 and grid conductor (n+1)
109 Stray capacitor between conductor (n) and ground
110 Stray capacitor between conductor (n+1) and ground
111 Stray capacitor between conductor (n) and conductor (n+1)
120 Switching timing for analog multiplexer
121 Switching timing for gain changing
122 Operating timing for switch 28
123 Operating timing for sample/hold switch 44
124 AM detector waveform
125 A/D converter input waveform
126 A/D conversion operating timing
131 Signal detection level characteristics by the nth and n+1th grid conductors
132 Signal detection level characteristics by the n+1th and n+2th grid conductors
133 Signal detection level characteristics by the n+2th and n+3th grid conductors
140 AC power receive coil
141 AC power resonance capacitor
142 Rectifying diode
143 Rectifying diode
144 Voltage regulator
145 Mutual inductance coupling
146 Exciting loop coil
147 AC power oscillator
150 Solar battery
151 Rechargeable battery charge controller
152 Diode
153 Diode
154 Rechargeable battery
155 Voltage regulator

DESCRIPTION OF PREFERRED EMBODIMENTS

Figure 1B:
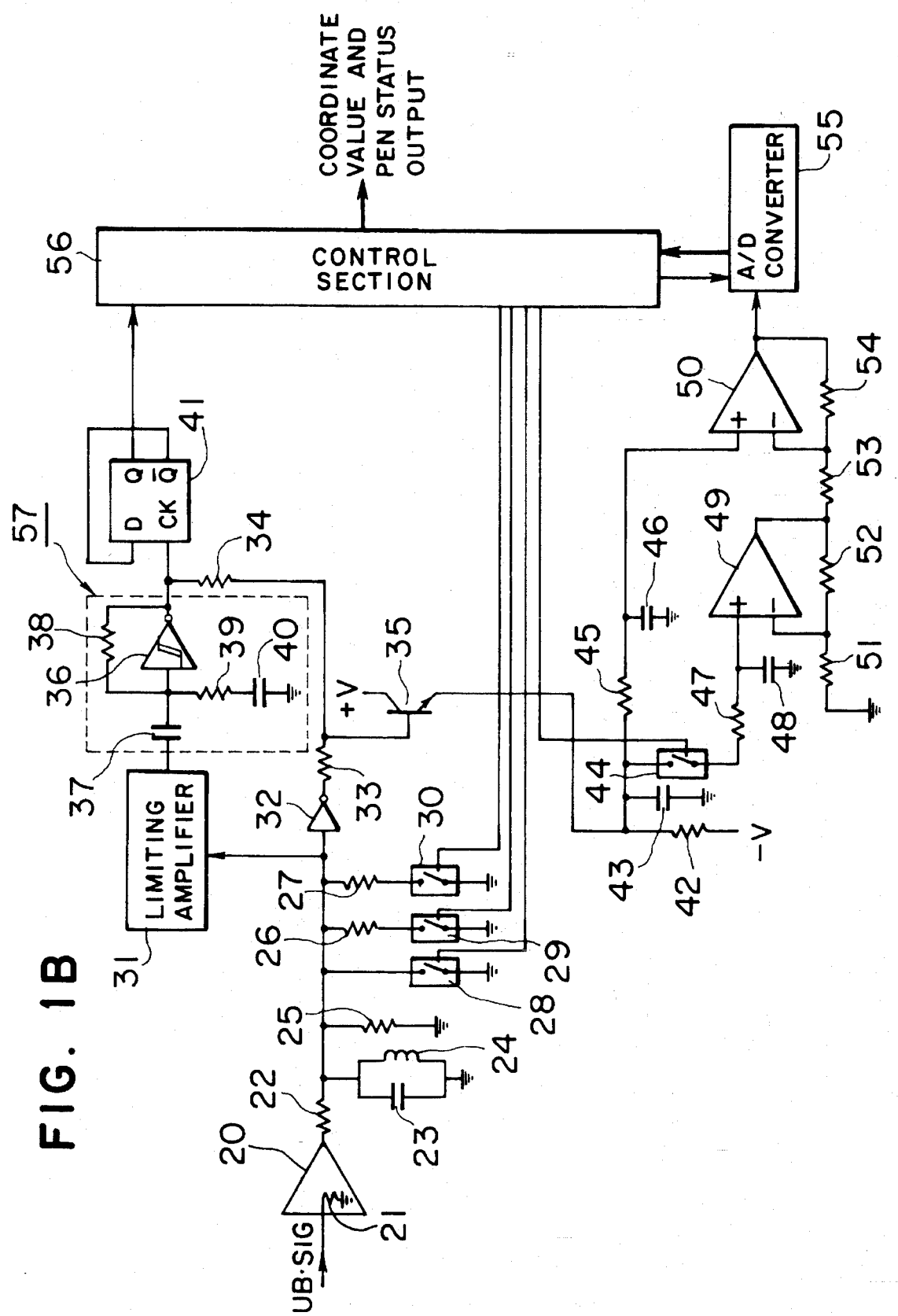

The present invention will now be described in detail with reference to the accompanying drawings. FIGS. 1A and 1B are respectively structural views of the entire apparatus according to an embodiment of the present invention. A balanced sinewave generator or a balanced squarewave generator 1, which is an active circuit, is disposed within a cordless pen 5 to generate a continuous AC signal in balance. A balanced output of the balanced AC signal generator 1 is applied to a stylus conductor 3 at an extreme end of the pen 5 and a ring-like conductor 4. A battery 2 defines a power supply section supplies an operating power to the active circuit within a pen 5.

The stylus conductor 3 at the extreme end of a pen 5 and the ring-like conductor 4 are, when they are present in the vicinity of a plate surface of a tablet 6, subjected to electrostatic capacity coupling of small capacity with grid-like conductors 7, 7, 7 ... of the tablet 6. Accordingly, a balanced electric signal between the stylus conductor 3 at the extreme end of the pen 5 and the ring-like conductor 4 is transmitted in pseudo balance form at a level according to the magnitude of the coupling capacities of the grid conductors 7, 7, ... in the tablet 6. There are also present unbalanced signal components, which will be described in detail in the following equivalent circuit.

Figure 4:
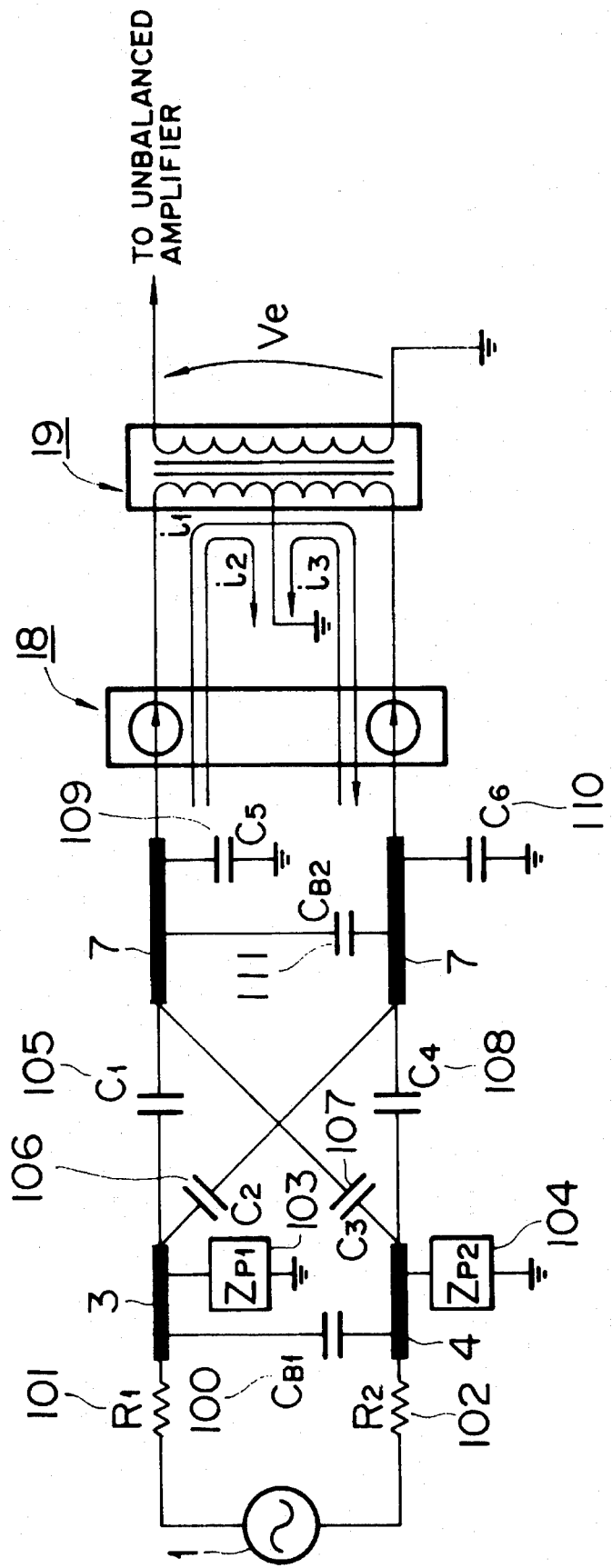
FIG. 4 is an equivalent circuit for transmission of signals.

An AC signal transmitting equivalent circuit in the actual circuit is shown in FIG. 4. A resistor R1 (101) and a resistor R2 (102) are a balanced dividing output impedance of the balanced AC signal generator 1; a capacitor CB1 (101) is a stray capacitance between two conductors (a stylus and a ring-like) at the extreme end of the cordless pen 5; a capacitor C1 (105) is a coupling capacitance between the stylus conductor 3 at the extreme end of the pen and the grid conductor n (7) of the tablet 6; a capacitor C2 (106) is a coupling capacitance between the stylus conductor 3 at the extreme end of the pen 5 and the grid conductor n+1 (7) of the tablet; a capacitor C3(107) is a coupling capacitance between the ring-like conductor 4 at the extreme end of the pen 5 and the grid conductor n (7) of the tablet 6; and a capacitor C4 (108) is a coupling capacitance between the ring-like conductor 4 at the extreme end of the pen 5 and the conductor n+1 (7) of the tablet 6. The aforesaid n represents a number of suitable conductors in the vicinity of the extreme end of the pen 5.

The stylus conductor 3 and the ring-like conductor 4 at the extreme end of the pen 5 have the effect of the pseudo ground through the human body who operates the apparatus or through the stray capacitance with respect to the circuit ground or by the electromagnetic wave radiating impedance to a space. Assuming now that these pseudo effects are pseudo ground impedances ZP1 (103) and ZP2 (104), respectively, as shown in FIG. 4, the ZP2 (104) (the pseudo ground impedance of the ring-like conductor 4) normally indicates a low value since it principally has a larger surface area and is close to the human body. Further, the coupled capacitances C1 to C4 also vary according to the position of the pen 5 on the tablet 6. Accordingly, there is present an unexpected cause of unbalance between the balanced signal lines. Two unbalanced (single end) signal components other than the balanced signal slightly enter the adjacent grid conductors n (7) and n+1 (7) due to the aforementioned unexpected cause. Stray capacitances C5 (109) and C6 (110) are present between the adjacent grid conductors n (7) and n+1 (7) and the circuit ground, and a stray capacitance CB2 (111) is also present between the adjacent grid conductors n (7) and n+1 (7). However, the charge and discharge currents of capacitances of C5, C6 and CB2 are rarely present due to very low input impedances of a balanced current buffer amplifier 18, therefore substantially eliminating the cause of unbalance.

The balanced signal and unbalanced signals will be further described in detail. Signals from the adjacent grid conductors n (7) and n+1 (7) are applied to a current buffer amplifier 18. The current buffer amplifier 18 has a very low input impedance, therefore an input signal cannot vary in voltage but can vary as a current. Its input current value is outputted without modification but operates as a current source irrespective of an output voltage. The output of the current buffer amplifier 18 is applied to a balance-to-unbalance translator 19 as shown in FIG. 4.

The AC signal transmitted to the adjacent grid conductors n (7) and n+1 (7) are transmitted as currents to the balance-to-unbalance translator 19. Here, a balanced signal component is indicated at i1, and the aforementioned two unbalanced signal components are indicated at i2 and i3 as shown in FIG. 4. Here, the unbalanced signal components i2 and i3 are analyzed into the sum and the difference as follows:

$$ic = i2 + i3$$

$$id = i2 - i3$$

where ic is a sum or common mode component, and id is a differential component.

The sum component (common mode component) is completely removed by the characteristics of the balance-to-unbalance translator 19 used here. The differential component is handled as the current-to-voltage conversion similarly to the balanced signal component. Accordingly, the voltage output Ve after having been unbalance-converted is given by $$Ve = K(i1 + id)$$ Equation 1 wherein K represents the coefficient of current-to-voltage conversion. As will be understood from Equation 1, the present apparatus also utilizes the differential component (effective signal component) of two unbalanced signals as well as the balanced signal component to prevent the efficiency from being lowered.

The present apparatus is of the current detection type as previously mentioned. The stray capacitances incidental to the grid conductors 7, 7, 7, . . . , of the tablet 6, the stray capacitances incidental to analog multiplexers 8 and 9 shown in FIG. 1, and the stray capacitance in a pattern of a printed circuit board rarely involve a loss of signal level caused by the charge and discharge of the capacitances since their AC voltages are almost completely zero, which accordingly does not actually affect the transmission of AC signals.

The foreign noises will now be described. Most of foreign noises (not shown) which enter the signal path enter as common mode noises since a noise source is normally at a relatively remote distance as compared with the line spacing of the balanced signal transmission line. The common mode noises are completely obstructed by the balance-to-unbalance translator. A component of an off-frequency band out of a small amount of noise components which entered as a differential component of the unbalanced signals is removed by a band pass filter which will be described later. Since the present apparatus uses frequencies in a considerably narrow band as compared with a conventional digitizing apparatus using a cordless pen, and also aided by the geometrical effect with the aforementioned balanced signal transmission system, the entry of harmful noise components is very small. The S/N ration at a signal level of an AM detector is extremely excellent, thus rendering possible the stable determination of a positional coordinate of the pen 5 on a tablet 6.

As an example, while in a conventional digitizer using a cordless pen the frequency used is 40 to 100 KHz, the present digitizing apparatus uses a frequency of about 455 KHz, in which more signals are transmitted, through the coupling capacitance between the pen and the grid conductors, to improve the efficiency.

In FIG. 1, the analog multiplexers 8 and 9 in the X and Y directions successively switch a pair of adjacent grid conductors out of the grid conductors 7, 7, 7, . . . , and the major balanced and minor unbalanced received signals are applied to the balanced current buffer amplifier 18 through AC coupling capacitors 16 and 17. The X and Y directions are alternately operable so that, for example, when the analog multiplexer 8 in the X direction selects suitable adjacent conductors 7, 7, the analog multiplexer 9 in the Y direction remains turned off. DC level fixing resistors 10, 11, 12 and 13 always maintain the DC potentials of the output points of the grid conductors 7, 7, 7, and the analog multiplexers 8 and 9 at zero volt to minimize a switching shock output caused by a potential difference when the analog multiplexers 8 and 9 are switched. These points rarely affect a change of the AC signal voltage, and only the AC signal current flows. Therefore, the AC signal strength is not affected by the application of 1 to 10k ohm by the DC level fixing resistors 10, 11, 12 and 13.

The balanced current buffer amplifier 18 is paired with base grounded transistors, and an input impedance of an emitter has a low value such as about 50 ohm. Variation in voltage of the input AC signal rarely occurs, and only the current change is accepted. Accordingly, only the current of the AC signal flowing into the emitter is transmitted to the collector but it operates as a current source nearly irrespective of the voltage of the collector. The output of the current buffer amplifier 18 is applied to a balance-to-unbalance translator with a band pass filter 19 and is translated into an unbalanced voltage by the function explained in the equivalent circuit shown in FIG. 4. Further, there is also provided a parallel resonance circuit which serves as a band pass filter for accepting only a fundamental frequency component of the AC signal. Even in the case where the AC signal generator 1 within the pen 5 is a squarewave generator, the entire circuit up to this stage is linear, which is therefore equivalent to the fact that a sinewave of the fundamental frequency component is generated within the pen 5. This merit will be described later. The function of this band pass filter obtained by the balanced parallel resonance circuit has a narrow band passage characteristic to attenuate even undesired frequency band noises of the unbalanced differential component entered in the midst of the signal path.

The balanced current buffer amplifier 18 and the balance-to-unbalance translator with a band pass filter 19 are combined to effect a current-to-voltage conversion. An output signal voltage (UB SIG) of the balance-to-unbalance translator with a band pass filter 19 is applied to an amplifier 20 shown in FIG. 1B. An input impedance 21 of the amplifier 20 limits a resonance Q value of the balance-to-unbalance translator with a band pass filter 19 to an adequate value. A resistor 22 connected to the output of the amplifier 20 is adapted to increase an output impedance of the amplifier 20 and constitutes a part of a dividing resistor for varying gain, which will be described below.

A capacitor 23 and a coil 24 constitute a parallel resonance circuit which has the same effect of the band pass filter to attenuate undesired frequency band noises entered up to this stage. A resistor 25 limits the Q value of the resonance circuit formed by the capacitor 23 and the coil 24 to a suitable value and adequately limits the overall gain of the present apparatus. A switch 28 is provided to forcibly bring a signal level to zero, and is turned on when a signal zero level is automatically corrected, the detail of which will be described later. Resistors 26, 27 and switches 29, 30 are provided to vary the overall gain in four ways. The resistor 26 is different in value from that of the resistor 27. Making the gain variable is necessary particularly in the case where when the resistive (thin film transparent) grid conductors 7, 7, 7, . . . are used, a signal level is greatly changed in dependency of a position of the pen 5 on the tablet 6, and the measured level is made about even.

Reference numeral 31 designates a limiting amplifier, which surely stabilizes the operation of a phase synchronizing oscillator 57 which is provided in the next stage. The phase synchronizing oscillator 57 is locked in phase to an input signal to generate a clock pulse (near-squarewave), and oscillates with nearly the same frequency even if an input signal level is zero.

The principle of the phase synchronizing oscillation is that a CMOS Schmidt inverter 36 repeats the oscillation of continuous pulses due to the feedback of a resistor 38 and a capacitor 37, providing an oscillation output waveform close to a squarewave. At this time, a voltage level of the capacitor 37 is aided by an input signal voltage for synchronizing the phase of the oscillation to the input signal. The relationship of each constant is represented by:

$(Vc \times R39)/(R38+R39) >$ hysteresis voltage of Schmidt inverter 36

Vc=Power supply voltage of CMOS Schmidt inverter 36

$10 \times$ (output impedance of limiting amplifier 31) $\leq (R38 \times R39)/(R38+R39)$ The capacitor 37 has a value such that the free oscillation frequency is substantially equal to the input frequency. A capacitor 40 has a value such as to be a sufficiently low impedance in the oscillation frequency. The typical value for the capacitors 37,40 when the frequency used is 455 KHz are indicated in the list of reference numerals described above following the brief description of the drawings.

A D-flip-flop 41 divides its input frequency by 2, and the output thereof is applied to a control section 56 which controls the entirety of the present apparatus. The control section 56 digitally counts its input frequency for decoding the statuses (status of ON/OFF of a side switch 72 and status of ON/OFF of a stylus pressure sensitive switch 73) of the pen 5. The purpose of making the input signal frequency ½ by the D-flip-flop 41 to use the squarewave at the control section 56 is to considerably improve the instability of the system due to the undesired feedback loop. The operation therefor will be described in detail.

In the actual circuit, the feedback from the control section 56 to each stage close to the signal input section exists more or less principally through the stray capacitive coupling or through the electromagnetic coupling and by the impedance (not zero) of the power supply line and the ground line. The greater the system gain the more significant the problem in this undesired feedback loop is, frequently giving rise to unstable oscillation.

The output of the D-flip-flop 41 is a squarewave of the frequency ½ of the input frequency. The nature of the squarewave is not to contain the same frequency component as that of the signal frequency of the present apparatus since its second harmonic component is zero. Accordingly, no feedback from the control section 56 with the same frequency as the signal frequency is present. Even the feedback of the frequency component other than the above is obstructed by band pass filters 19, 23 and 24, which is a small loop gain that can be ignored. Despite the fact that the overall gain of the present apparatus is close to 100 dB, the apparatus can be operated in a stable manner at a low cost without applying a shield for the reason mentioned above.

A first object of using a phase inverting amplifier 32 is to make its output phase equal to that of a phase synchronizing oscillator 57, and a second object thereof is to amplify it to a signal level required for the signal amplitude detection. Resistors 33 and 34 are provided to superimpose two signals of the same phase, the details of which will be described below in connection with the signal amplitude detection.

A detector transistor 35, a detector capacitor 43 and a current sinking resistor 42 constitute a signal amplitude detector circuit. The current sinking resistor 42 always allows a substantially constant current to flow out of the signal amplitude detector circuit. A positive side peak voltage value of a base input of the detector transistor 35 is temporarily held as an instantaneous value in the detector capacitor 43 connected to the emitter of the transistor 35 (offset voltage V BE between the base and emitter present). When the peak time of the input signal passes, the detector transistor 35 is turned OFF and the detector capacitor 43 is gradually discharged. Here, there is a problem with the detector linearity at the time of a low signal level.

The V BE when no signal is present is a base emitter forward voltage value (DC bias value) with respect to a constant current (an average current) which flows out through the current sinking resistor 42. When a signal is present, an intermittent current flows into the detector transistor 35, and its peak current is greater than an average current. Thus, the fact that the V BE with respect to the peak current is greater than the V BE when no signal is present as described above causes the linearity to deteriorate. The present invention also improves this point.

An intermittent current is always (even when no signal is present) caused to flow into the detector transistor 35 (AC bias is provided) to minimize a difference in V BE at all times so that the linearity is improved. However, the AC bias signal should be in the same phase as that of the input signal, and even when no signal is present, the AC bias is necessary. In the present apparatus, the near-squarewave output of the phase synchronizing oscillator 57 is superimposed in the same phase to the signal voltage of the resistor 33 through the resistor 34. The detector output voltage when no signal is inputted has a difference in each apparatus due to unevenness of resistors, unevenness of semiconductors, etc., and the V BE of the detector transistor 35 varies with the temperature and further varies with the change after passage of the power supply voltage year after year and is not constant. In the present apparatus, the drift of the detection output voltage is automatically canceled, details of which will be described hereinbelow.

A switch 44, a resistor 47 and a capacitor 48 constitute a sample/hold circuit. Prior to the measurement of AC signal levels coming from the adjacent grid conductors 7, 7, . . . , a signal is temporarily set to zero by the switch 28° Then the switch 44 is turned on to sample the detection level in the capacitor 48. At the time when the zero signal detection level has been sufficiently sampled (after passage of the settling time by the resistor 47 and the capacitor 48), the switch 44 is turned off, and after this, the capacitor 48 stores the zero signal detection level as an analog voltage for a necessary period of time. Thereafter, the control section 56 causes the switch 28 to turn OFF to feed the input AC signal to the detector circuit.

Figure 5:
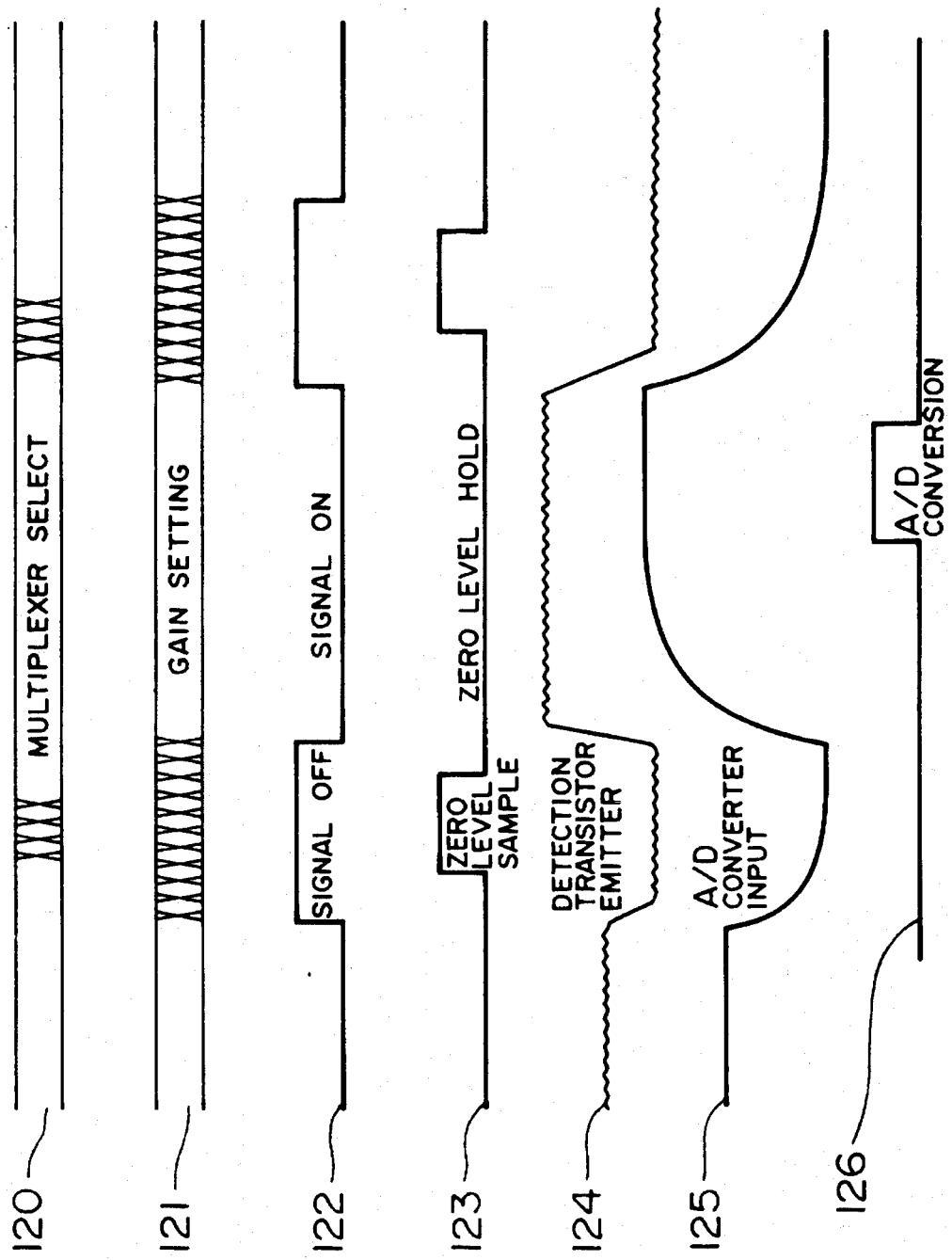
FIG. 5 shows a timing for operation of detecting a signal level and detection waveforms.

As shown in the detection waveform indicated by reference numeral 124 in FIG. 5, the detector output has a small ripple. A resistor 45 and a capacitor 46 constitute a low pass filter, which removes the aforesaid ripple. A resistor 47 and a capacitor 48 in the sample/hold circuit also have a function of a low pass filter. Operational amplifiers 49 and 50 and resistors 51 and 54 constitute a circuit for automatically canceling the drift and non-signal level. Values of the resistors 51 to 54 can be suitably selected to thereby cancel the aforementioned non-signal level from the detection voltage and to amplify the true detection level and also offset its dynamic range which is adapted to the input voltage range of an A/D converter 55. A measured signal level of the AC signal converted into a digital value by the A/D converter 55 is applied to the control section 56.

The timing of the measurement Of the AC signal at every adjacent grid conductor will be briefly explained with reference to FIG. 5. Timing indicated at reference numeral 120 shows the switching time of the analog multiplexers 8 and 9. The time other than those indicated by the diagonal lines indicates the period for fixing the multiplexer selection. At this time the AC signals from the selected adjacent grid conductors 7, 7 are transmitted to the current buffer amplifier 18. Timing indicated at reference numeral 121 indicates the period for fixing the gain setting by switches 29 and 30 (FIG. 1B) which select the overall gain of the present apparatus. Timing indicated at reference number 122 indicates the operating timing for the switch 28 shown in FIG. 1B, in which the AC signal is forcibly set to zero at the time the signal cannot be measured when the multiplexers 8 and 9 are switched and allocated to the time of the zero signal detection level sample. Timing indicated at reference numeral 123 is the timing of the switch 44 shown in FIG. 1B, in which the zero signal detection level is sampled within the time when an emitter waveform 124 of the detector transistor 35 is in a steady state.

The waveform indicated at reference numeral 124 is an AM detection waveform, which shows a voltage of an emitter of the detector transistor 35, in which amplitude detection is effected as shown accordingly to the operation of the switch 28 (timing indicated at reference numeral 122). The waveform indicated at reference numeral 125 is an input voltage waveform of the A/D converter 55, which is the voltage waveform which is gently varied by the low pass filters 45 and 46 and is already canceled with a drift voltage by a zero signal detection level when a signal indicated at reference numeral 122 is turned on. Timing indicated at reference numeral 126 indicates the time of A/D conversion operation, in which the A/D converter is effected at the time when an AC detection level indicated at reference numeral 125 is sufficiently settled. While in the above explanation a sample of the zero signal detection level is effected at the rate of once per measurement of the AC signal level, it is to be noted of course that a sample of the zero signal detection level may be effected at the rate of one per scores of measurements of the AC signal levels.

Figure 6:
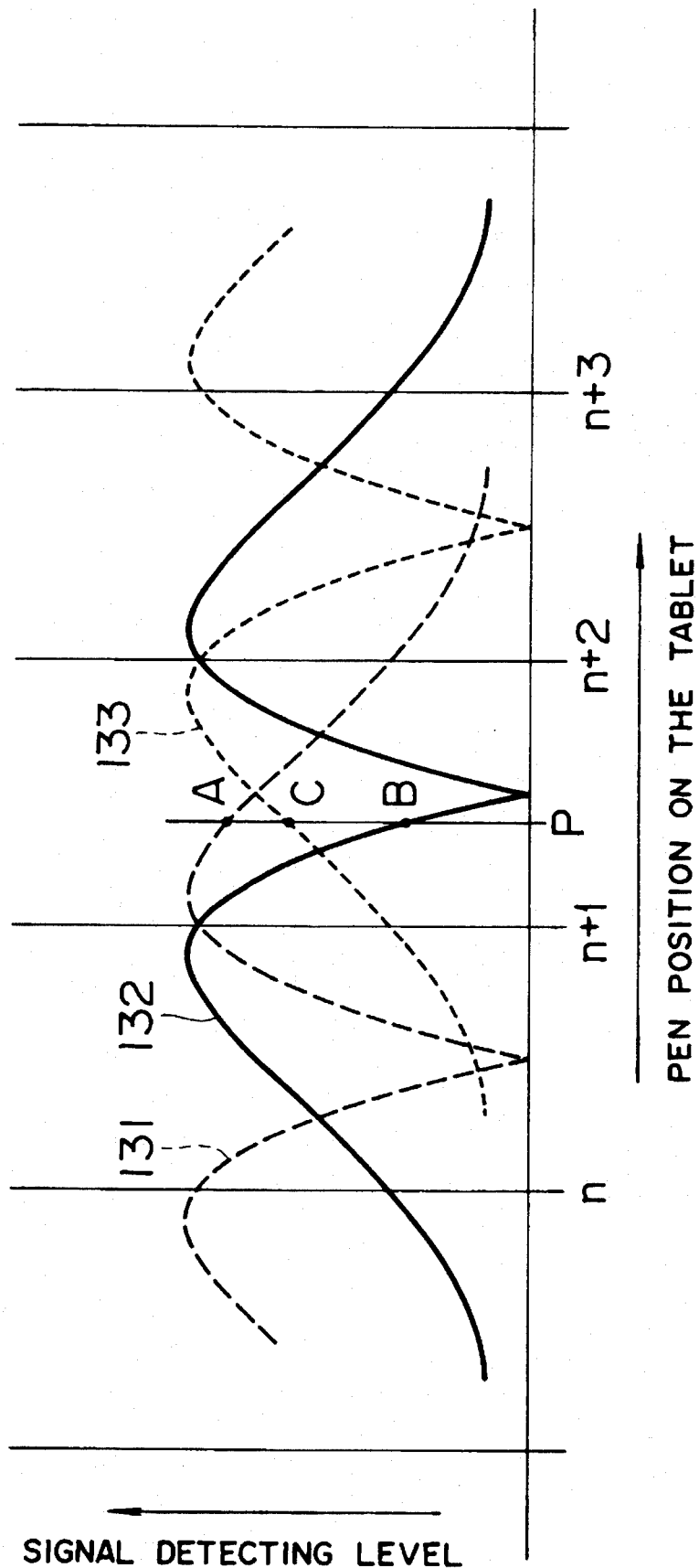
FIG. 6 is an explanatory view for a signal detection level.

Next, the AC signal level according to the position of the pen 5 on the tablet 6 and the determination of a coordinate thereof will be described. In order to observe the AC signal between two adjacent grid conductors out of the grid conductors 7, 7, 7, . . . in the tablet 6 through the balanced current buffer amplifier 18 and the balance-to-unbalance translator 19, a signal detection level with respect to the X-axis position (as well as the Y-axis position) of the stylus conductor 3 at the extreme end of the pen 5 on the tablet 6 is shown in FIG. 6, which is in the shape of two chevrons symmetrical to left and right whose center is dipped. A characteristic curve 131 indicates a signal detection characteristic formed by the nth and n+1th grid conductors 7, 7 (n represents the suitable number of grid conductor). A characteristic curve 132 indicates a characteristic formed by the n+1th and n+2th grid conductors 7, 7, and a characteristic curve 132 indicates a characteristic formed by the n+2th and n+3th conductors 7, 7. In the case where the pen 5 is at a specific position (P position), detections are made at level A, level B, and level C, respectively, and the position P must be interpolated to determine the positional coordinate.

It is understood that a determination of between which grid conductors and in which half section the stylus conductor 3 at the extreme end of the pen 5 is present can be made from the upper two levels of the signal levels detected by every adjacent grid conductor 7, 7, . . . and from the connection position of the multiplexers 8 and 9 by which detection levels are obtained. A P position within the upper or lower half section of the spacing between the adjacent grid conductors is determined by the interpolation which will be described below. In the present apparatus, the coordinate determination for a large tablet and a small tablet by different interpolation means is effected. A first interpolation means and a second interpolation means are used for a small tablet and a large tablet, respectively, as further described below.

Figure 7:
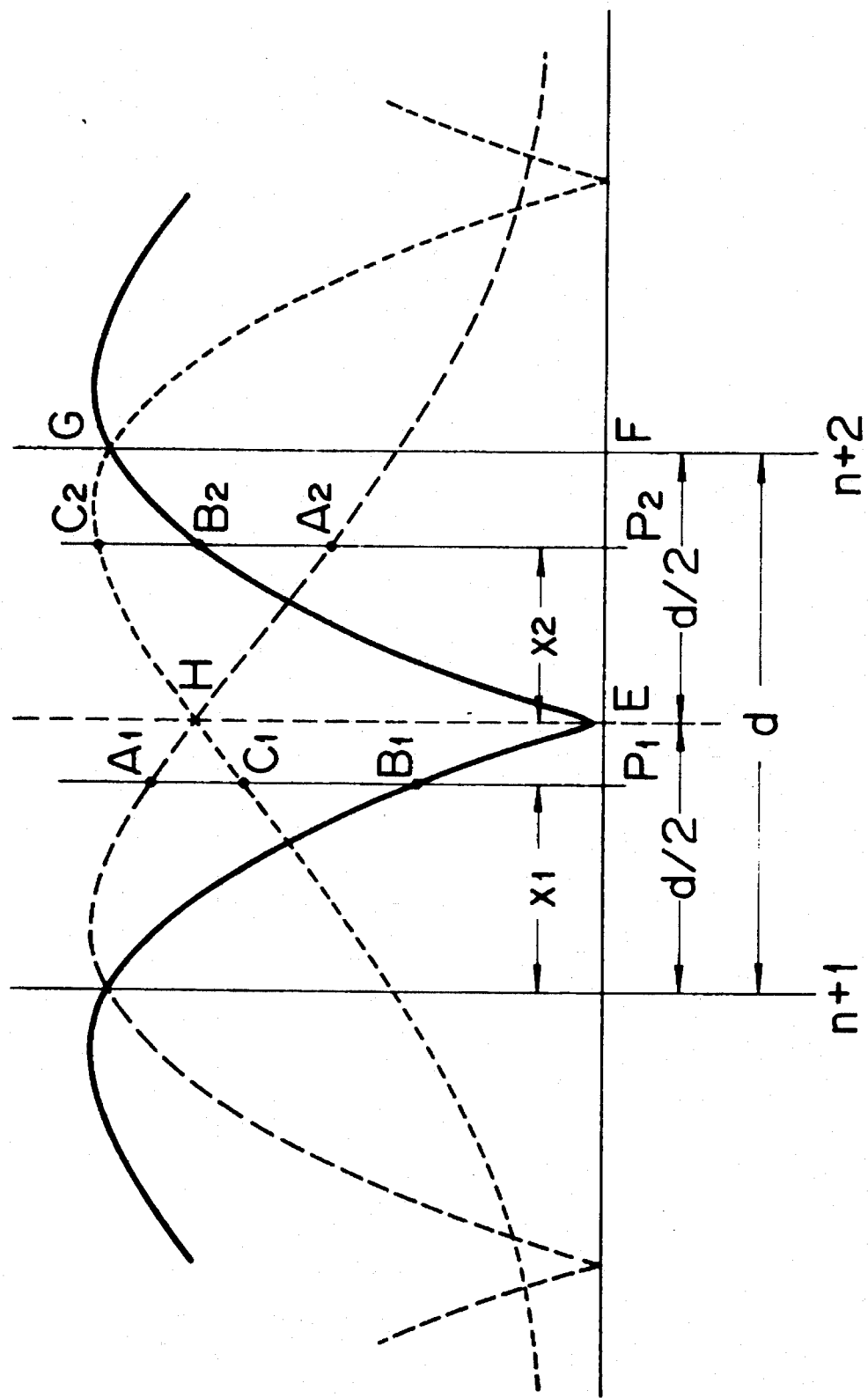
FIG. 7 is an explanatory view of an interpolation method.

FIG. 7 is a view showing the center portion of FIG. 6 enlarged to left and right and is an example in which a point P (a pen position) is present between the n+1th conductor and the n+2th conductor, P1 being the case where the point P is present in the left (lower side) half section, and P2 being the case where the point P is present in the right (upper side)

half section. d represents the spacing between the adjacent grid conductors 7, 7, x1 represents the interpolation amount with respect to P1, and x2 represents the interpolation amount with respect to P2. x1 is the distance from the center of the n+1th grid conductor to P1, and x2 is the distance from an intermediate point between the n+1th and the n+2th grid conductors to P2. If the characteristic curve 131 represents curve A, the characteristic curve 132 represents curve B and the characteristic curve 133 represents curve C, then the detection level of A1, B1 and C1 will be at point P1, and the detection level of A2, B2 and C2 will be at point P2.

Figure 8:
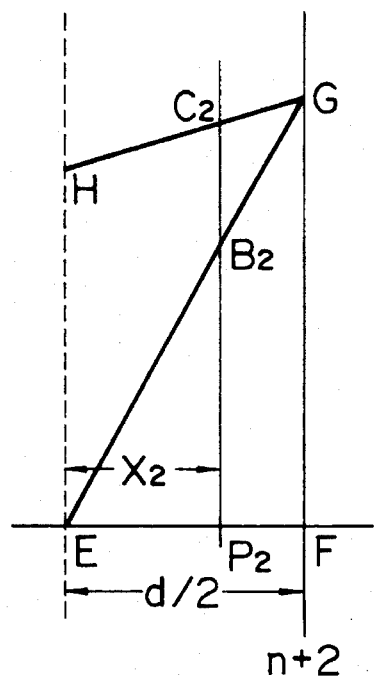
FIG. 8 is an explanatory view of a first interpolation method.

In the first interpolation means, the manner of obtaining the interpolation amount x2 of P2 will be first explained for the convenience of explanation. With respect to points E, F, G and H shown in FIG. 7, an approximate linear figure is interpolated as shown in FIG. 8. Here, a straight line EG is obtained by linearly approximating the EG section of curve B, and a straight line HG is obtained by linearly approximating the HG section of curve C. Paying attention to a triangle EFG, it is understood that the size of B2 is proportional to the approximate interpolation amount X2. When the interpolation section d/2 is normalized to 1, a point in which the straight line HG passing C2 crosses the straight line EG is just above the center line of the n+2th grid conductor, and therefore, the level B2 can be normalized by the level C2. That is, B2/C2 is a normalized measured level, which is proportional to the normalized approximate interpolation amount and uniquely corresponds thereto. The proportional coefficient thereof is 1. Thus, the following is given:

Normalized approximate interpolation amount=B2/C2. Accordingly, the approximate interpolation amount X2 is given by:

$$X2 = (d/2)*(B2/C2) \qquad \text{Equation 2}$$

In the approximate interpolation amount obtained by Equation 2, curve B and curve C are regarded as a straight line, which is slightly deviated from an actual position of the extreme end of the pen 5. This deviation is corrected by a correction table. However, the correction characteristics differs, though slight, with the shape and size of the grid conductor pattern, the physical dimensions of the stylus conductor 3 and the ring-like conductor 4 at the extreme end of the pen 5, and the thickness of an insulating layer for covering the conductors 7, 7, 7, .... However, by handling the normalized amounts, one kind of the correction table will suffice, thus simplifying the control section 56.

On the other hand, in the case where the interpolation amount x1 with respect to P1 is obtained, an approximate triangle is reversed. Therefore, the following is given:

Normalized approximate interpolation amount=1−(B1/A1). Accordingly, the approximate interpolation amount X1 is given by $$X1 = (d/2)*(1 - B1/A1) \qquad \text{Equation 3}$$

This is corrected by the above-mentioned correction table and a mirror symmetrical correction table to obtain an actual interpolation amount x1.

Alternatively, considering the interpolation amount leftward from the intermediate point between the n+1 and n+2th grid conductors without considering x1, it is symmetrical to left and right with respect to the intermediate line HE in FIG. 7, and the interpolation amount of P1 can be made to totally the same type as that of Equation 2 (provided that A1 is used in place of C2). In this case, the mirror symmetrical interpolation table is not necessary.

In the case where the small tablet is used, the above-described first interpolation means will suffice. Incidentally, in the case where in a transparent tablet having an effective area of 20 cm×15 cm, d=4 mm, 0.25 mm of absolute position detection is obtained.

The second interpolation means for a large tablet will be described below. The way of obtaining the interpolation amount x1 of P1 will be first explained for the convenience of explanation. While in the first interpolation method two measured values have been used for the approximate interpolation calculation, it is to be noted that in the second interpolation means three measured values are used for the approximate interpolation calculation. In case of a large tablet, it is difficult to completely coincide a position of an intersection between curve A and curve C (which half section is determined with this intersection being a border) with a position of a dip point of curve B due to the accuracy in terms of manufacture of the grid conductor pattern, the arrangement of a wiring pattern on a printed circuit board, etc. In the case where the first interpolation means is used, it is difficult to retain the continuity of a detection position at an intermediate point between the adjacent grid conductors with high accuracy. This difficulty can be improved by the second interpolation means.

Figure 9:
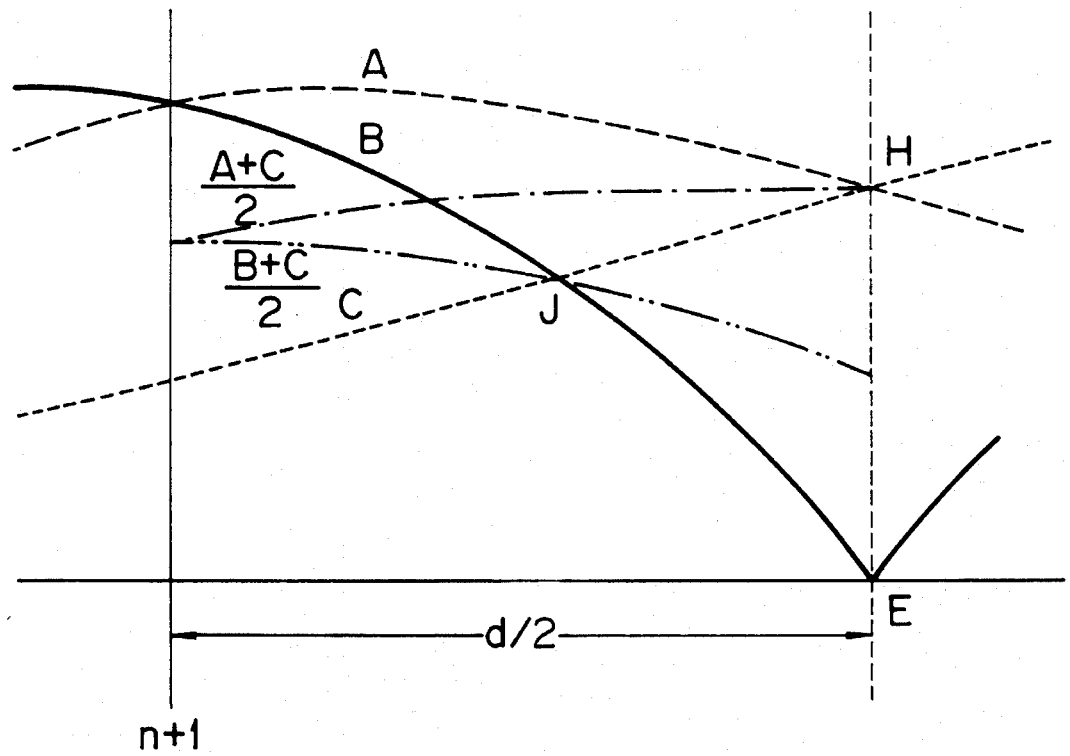
FIG. 9 is an explanatory view of a second interpolation method.

FIG. 9 shows an enlarged half section shown in FIG. 7 where P1 is present. In a sense that an error is minimized, an average (A+C)/2 between curve A and curve C and an average (B+C)/2 between curve B and curve C are taken into consideration. The curve (A+C)/2 is less varied due to the position and is very convenient as a divisor for normalization. When two times the difference between two average curves (A+C)/2 and (B+C)/2 is divided by (A+C)/2, the following is obtained:

$$\frac{\left(\frac{A+C}{2} - \frac{B+C}{2}\right)*2}{\frac{A+C}{2}} = \frac{2(A-B)}{A+C} \qquad \text{Equation 4}$$

This is one normalized approximate interpolation amount. This provides an excellent linearity for location other than that in the vicinity of the intermediate point between the n+1th and n+2th grid conductors, and that d/2 times of Equation 4 is very close to the position of the extreme end of the signal pen 5. A further normalized approximate interpolation amount is taken into consideration in order to enhance the accuracy in the vicinity of the intermediate point between the grid conductors.

Since the deviation at the dip point of curve B tends to lower the accuracy, the following Equation is taken into consideration in which only the curve A and curve C were used in the vicinity of the of the intermediate point between the grid conductors:

$$1 - \frac{(A-C)0.5}{\frac{A+C}{2}} \qquad \text{Equation 5}$$

In this equation, a multiplier of 0.5 is a value obtained from many patterns and sizes of the grid conductors.

Let point J be the intersection between curve B and curve C, then Equation 4 is used for the left from point J and a combination of Equation 4 and 5 is used for the section on the right side from point J. With respect to the percentage of such combination, in order that the closer to the point J, the percentage of Equation 4 is increased, and the closer to the intermediate point between the grid conductors, the percentage of Equation 5 is increased, the following is used as the percentage of Equation 5 making use of the triangle JEH:

$$\frac{C-B}{\frac{A+C}{2}}$$

The percentage of Equation 4 is represented by $$1-\frac{C-B}{\frac{A+C}{2}}$$

Accordingly, in the section of C>B, there is obtained the normalized approximate interpolation amount represented by $$\frac{2(A-B)}{A+C}*\left(1-\frac{C-B}{\frac{A+C}{2}}\right)+\left(1-\frac{(A-C)0.5}{\frac{A+C}{2}}\right)* \quad \text{Equation 6}$$

$$\frac{C-B}{\frac{A+C}{2}}=2\left\{1-\frac{A(3C-B)+(B+C)(2B-C)}{(A+C)^2}\right\}$$

Accordingly, when B1≧C1, the approximate interpolation amount X1 results from that d/2 times of Equation 4, and when B1<C1, the approximate interpolation amount X1 results from that d/2 times of Equation 6.

This approximate interpolation amount X1 is very close to the actual interpolation amount x1 and usually needs not be further corrected by the interpolation table. Similarly, in the case where point P is present in the right (upper side) half section, the approximate interpolation amount X2 is represented by
when B2≦A2, $$X2=d*(\frac{1}{2}-(C-B)/(A+C)) \quad \text{Equation 7}$$

when B2<A2, $$X2=d*\left\{\frac{C(3A-B)+(A+B)(2B-A)}{(A+C)^2}-\frac{1}{2}\right\} \quad \text{Equation 8}$$

This can be corrected by the correction table to provide the interpolation amount with higher accuracy. Furthermore, if the interpolation amount is contemplated reversely from the center point of the n+2th grid conductor without considering x2, similarly to the explanation in connection with the first interpolation means, the approximate interpolation amount with respect to P2 can also be obtained by the equation (A is replaced by C) of the same type as that of the approximate interpolation amount with respect to P1. In that case, only one type of correction table will suffice.

The control section 56 calculates numerical values in accordance with the above-described first or second interpolation means, determines coordinates X and Y of the extreme end of the pen 5 on the tablet 6 and outputs the coordinate information and the ON/OFF status information of the side switch 72 and the stylus pressure sensitive switch 73 of the pen 5.

Next, the circuit within the cordless pen 5 and the operation thereof will be described. With respect to the AC signal generator circuit, different circuits are used for a large tablet and a small tablet, respectively. In the circuit shown in FIG. 2, which is for the large tablet, two CMOS inverters 61 and 62 are used as active elements. Power is supplied to the active elements by the battery 2, which is turned ON and OFF by a switch 60.

The CMOS inverter 61 together with an electromechanical ceramic resonator 67 constitute a non-adjustment oscillator circuit. The output of the CMOS inverter 61 is a squarewave, which is applied to the stylus conductor 3 at the extreme end of the pen 5 through a resistor 64. This output is also applied to the CMOS inverter 62. The output of the CMOS inverter 62 is also a squarewave, whose phase is inverted. The output of the CMOS inverter 62 is applied to the ring-like conductor 4 at the extreme end of the pen 5 through a resistor 65. Since the output voltage amplitude of the CMOS inverters 61 and 62 swings nearly from the power supply voltage to the ground, the stylus conductor 3 and the ring-like conductor 4 are squarewave driven in balance with the peak to peak amplitude approximately twice of the power supply voltage.

The present apparatus utilizes only the fundamental frequency component even in the case of the squarewave signal as previously mentioned. As the nature of the squarewave, the amplitude of the fundamental frequency component has a peak to peak value 4/π times of the amplitude of the squarewave. Accordingly, the stylus conductor 3 and the ring-like conductor 4 is equivalent to that is driven in balance with a sinewave having a peak to peak amplitude (2*4/90 ≈2.5) times of the power supply voltage. Accordingly, a sufficient AC signal output level is obtained even with a low battery voltage.

In other words, there is obtained a peak to peak balanced output amplitude of fundamental frequency component 2.5 times or more of the power supply voltage without increasing the amplitude of signal waveforms at the respective points of the present oscillation circuit than the power supply voltage.

Further, since the CMOS inverters are used, there is extremely less power consumption, and a demand for high output voltage and low power consumption is fulfilled at a high level.

A switch 72 is a side switch of the pen 5, which switch is pressed by a finger of an operator and is one of the pen statuses. When the switch 72 is pressed, a resonance dividing capacitor 69 is connected in parallel with a capacitor 70 to lower the oscillation frequency by several kHz. Further, a switch 73 is a stylus pressure sensitive switch, which is turned ON when an operator presses the stylus 3 of the pen 5 against the plate surface of the tablet 6. This switch is also one of the pen statuses. When the switch 73 is turned ON, the capacitor 71 also causes the oscillation frequency to lower by several kHz. The capacitor 70 is different in capacity from that of the capacitor 71, and after all, the pen 5 outputs AC signals of four ways of frequencies with respect to four ways of status combinations of the switches 72 and 73. This frequency shift is subjected to status decoding when the control section 56 digitally counts output frequencies of the D-flip-flop 41 shown in FIG. 1B.

In the present circuit for the large tablet, where the battery voltage is 3.1 V and an oscillator frequency is 455 kHz, when the two status switches are turned OFF, a power source current is approximately 125 micro A. On the other hand, when two status switches are turned ON, a consuming current is 160 micro A. Since the noiseproof signal transmission system which constitutes a key point of the present invention is employed, a sufficient accuracy of positional detection for the tablet can be secured.

Figure 3A:
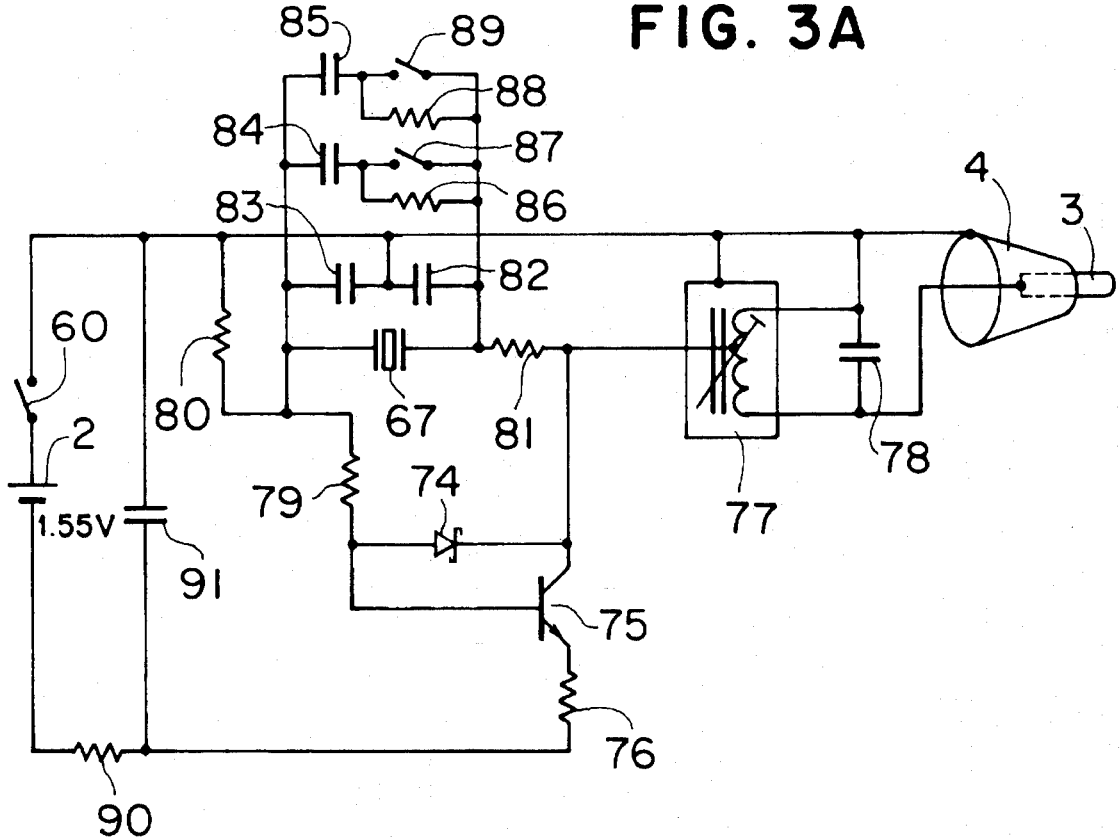
FIG. 3A is a circuit representation of the cordless pen for a small tablet.

Next, the circuit of a cordless pen for a small tablet is shown in FIG. 3A. An operating power for the present circuit is supplied by a single silver oxide button cell 2 of approximately 1.55 V. A resistor 90 is provided to prevent a surge current, and a capacitor 91 is provided to stabilize an instantaneous voltage.

The only active device in the present circuit is a transistor 75, whose collector drives a tap in the midst of a coil 77 of an output tank circuit 77 and 78. The output tank circuit 77 and 78 use the stored electric oscillation as the output of the parallel resonance circuit to place the stylus conductor 3 and the ring-like conductor 4 at the extreme end of the pen 5 in pseudo balanced voltage drive as shown in FIG. 3. The output waveform is a sinewave. A current from a positive side terminal of the cell 2 which is a power source passes through the power supply switch 60, mainly passes through the output resonance coil 77, passes through the collector and the emitter of the transistor 75, passes through the emitter resistor 76 and the surge current preventive resistor 90, and then returns to a negative side terminal of the cell 2.

A part of the electric oscillations of the output tank circuit 77 and 78 causes the electromechanical ceramic resonator 67 to subject to electromechanical oscillation through a resistor 81. The resonance dividing capacitors 82 and 83 are mounted in parallel with the electromechanical ceramic resonator 67 so that both ends of the electromechanical ceramic resonator 67 are placed in reverse phase to each other with respect to a power supply line since the intermediate point between the capacitors 82 and 83 is connected to a power supply line as shown, but the electromechanical oscillation frequency is finely shifted. A switch 87 is a side switch of the pen 5, which switch is pressed by a finger of an operator and is one of pen statuses. When the switch 87 is pressed, a capacitor 84 is connected in parallel with the electromechanical ceramic resonator 67 to lower the electromechanical oscillation frequency (for example, 455 kHz) by several kHz. A switch 89 is a stylus pressing switch, which is turned ON when an operator presses the stylus 3 of the pen 5 against the plate surface of the tablet 6. This switch is also one of the pen statuses. When the switch 89 is turned ON, the oscillation frequency is likewise lowered by several kHz by the capacitor 85. The capacitor 84 is different in capacity value from that of the capacitor 85, and after all, obtaining four ways of electromechanical oscillation frequencies with respect to four ways of status combinations of the switches 87 and 89. Resistors 86 and 88 are high resistors for fixing DC level of the frequency shift capacitors 84 and 85 to prevent a sudden change of DC bias value of the circuit at the moment when the switch 87 or 89 is turned ON.

The electromechanical ceramic resonator 67 is driven through the resistor 81 to effect the electromechanical oscillation. An Ac voltage in reverse phase as mentioned above is induced in the opposite terminal to AC drive the base of the transistor 75 through the resistor 79. The resistor 80 has a relatively high resistance for applying an operating DC bias of the transistor 75. The resistor 79 is not always necessary but is a resistor which has a function to stably operate the transistor 75 and a function to impart a voltage compliance to the electromechanical ceramic resonator 67. A Schottky-Barrier diode 74 is connected from the base toward the collector of the transistor 75, detail of the function of which will be described later. A resistor 76 is provided between the emitter of the transistor 75 and a negative power line, which resistor 76 has a function to stably operate the transistor 75 and a function to cause the transistor 75 to effect operation close to an ideal current source.

The oscillator operation of the present circuit will be described hereinbelow in detail. When the power switch 60 is turned ON, a capacitor 91 is charged through a resistor 90 to promptly reach a steady voltage, approximately 1.5 V. At the beginning, the output tank circuit-77 and 78 as well as the electromechanical ceramic resonator 67 are not under the electro-oscillation but the output tank circuit 77 and 78 is slightly excited by the fine variation of the power supply voltage or the fine noise generated by the transistor 75 to effect the fine oscillation. A part of the fine oscillation is transmitted also to the electromechanical ceramic resonator 67 through the resistor 81 to begin their electromechanical fine oscillation.

The voltage fine oscillation of the reverse phase is feedback to the base of the transistor 75, the phase is inverted by the transistor 75, and the collector thereof drives the output tank circuit 77 and 78 in the same phase. The electro-oscillation is gradually increased by this positive feedback loop which has a loop gain greater than one. In the initial stage, the operation of the transistor 75 is an A-class amplifier operation, and if the resonance frequency of the output tank circuit 77 and 78 is the frequency in the neighborhood of the frequency of the electromechanical ceramic resonator 67, the present circuit is oscillated and started without fail.

The oscillator frequency of the present circuit is determined mainly by the frequency of the electromechanical ceramic resonator 67 for determining the AC voltage to be feedback to the base of the transistor 75. The influence on the oscillation frequency of the output tank circuit 77 and 78 will be described later. As the aforementioned oscillation voltage increases, the base voltage, at the negative side peak, becomes lower than a level of the threshold voltage of the transistor 75. From this stage, only an intermittent current flows into the transistor 75, and the collector of the transistor 75 causes the output tank circuit 77 and 78 to effect one kind of switching drive. Even during switching drive, the output tank circuit 77 and 78 maintain a sinewave oscillation.

Figure 3B:
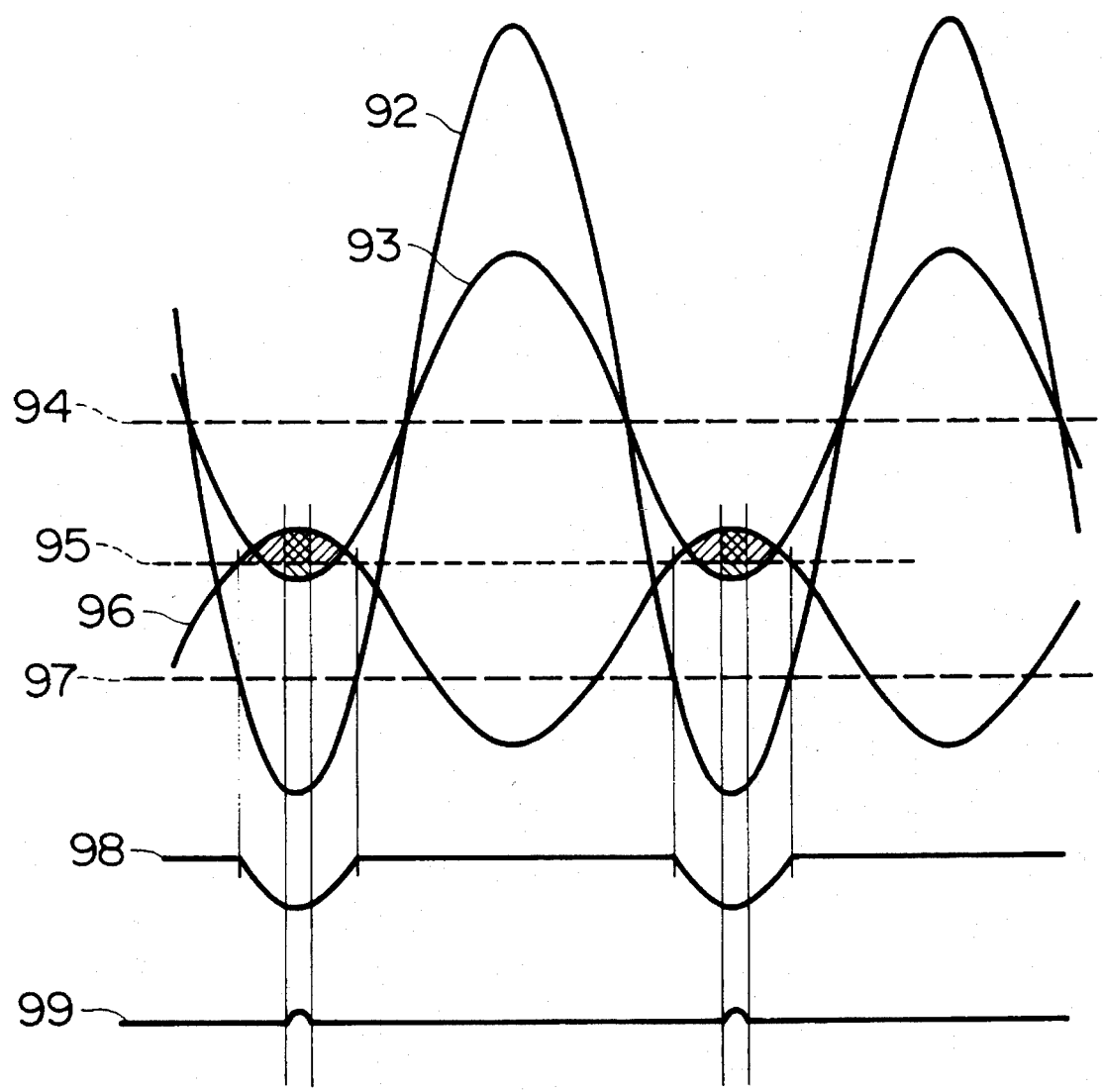
FIG. 3B shows voltage and current waveforms of the circuit in FIG. 3A with respect to a level of power supply.

When the oscillation voltage further increases, since the base of the transistor 75 is inverted in phase with the collector thereof, a positive peak voltage of the base becomes higher than a negative peak voltage of the collector (FIG. 3B). The Schottky-Barrier diode 74 has two functions, first of which is not to forcibly energize the transistor 75 itself to a saturated operation region as is well known, and a second of which is to control an oscillation level of the output tank circuit 77 and 78 at a constant value. Its operation will be described in detail. In FIG. 3B, a collector voltage waveform 93 is lower than a base voltage waveform 96 at the time of peak so that a current as shown by a current waveform 99 of the Schottky-Barrier diode 74 flows intermittently. A current flowing through DC bias applying resistor 80 includes an intermittent current flowing through the base of the transistor 75 and an intermittent current flowing through the Schottky-Barrier diode 74. Therefore, an average voltage drop of the resistor 80 increases, a base DC bias voltage of the transistor 75 becomes deepened, a current of the collector for driving the output tank circuit 77 and 78 also lowers, and an oscillator output voltage no longer increases. Since such feedback in the actual operation is applied, even if the switches 87 and 89 are turned ON so that the oscillation frequency is shifted, even if an output resonance coil is finely adjusted (object of which will be described later), or even if an unevenness of hFe of the individual transistor 75 is present, the output voltage can be maintained substantially constant.

In such a steady state as described, a base voltage of the transistor 75 will be a deep DC bias voltage by the above-described action as represented by the waveform 96 to bring the transistor 75 into an energized state only in the vicinity of a peak value of the oscillation voltage, thus assuming a collector current waveform as represented by the waveform 98 (in which the direction to be flown into the collector is shown at the negative direction). This is because of the fact that the transistor 75 is in the C-class operation, which is the circuit operation which is very efficient with respect to a power supply consuming current. Conversely speaking, the resistance of the DC bias applying resistor 80 is set so as to assume the operating state as described above.

The voltages of output tank circuit 77 and 78 swing greatly beyond the positive side power supply voltage which is the foundation level of the waveform for a half period as represented by the waveforms 92 and 93. Further, the output voltage 92 assumes a high output AC voltage level as a result of the collector voltage of the transistor 75 being boosted. Though the output impedance is high, the coupling capacitance between the stylus conductor 3 at the extreme end of the pen 5 and the grid conductor 7 of the tablet 6 is less than 1 pF during normal use, and the flowout of signal to the load is a low level which can be ignored in practice.

Further, the stray capacitance between the stylus conductor 3 at the extreme end of the pen 5 and the ring-like conductor 4 can be considered to be included in the output resonance capacitor 78 and, therefore, it rarely imposes a burden on the output tank circuit 77 and 78. Accordingly, such stray capacitance poses no problem even if high voltage levels between both ends of the output tank circuit 77 and 78 are directly outputted.

The oscillation frequency is essentially determined by the electrochemical resonator frequency. However, in the case of the present circuit, since reactance components of the output tank circuit 77 and 78 are gently coupled to the electrochemical ceramic resonator 67 by means of the resistor 81, the oscillation frequency can be adjusted by adjusting the output resonance coil 77 which is a semi-fixed inductance. Accordingly, the individual electromechanical ceramic resonators have a little error in frequency, but the error in frequency can be canceled in practice by the above-described arrangement. In case of the electromechanical ceramic resonator of 455 kHz, the frequency shift is 5 kHz at most with respect to four ways of pen statuses. Thus, since the frequency error of hundreds of Hz become a problem, this error adjusting function is important.

The output resonance coil 77 is accommodated within a shield case to avoid undesired electromagnetic coupling with the circuit pattern. In FIG. 3A, the resonance frequencies of the output tank circuit 77 and 78 are adjusted by varying the inductance of the coil 77 but the capacitance of the resonance capacitor 78 may be made variable. In the case of the present circuit, in which the output is 455 kHz, 5.5 Vpp, about 85 micro A of current is merely consumed from the power source of 1.55 V irrespective of two switch statuses, and the power consumption is thus very low. A cell life of one year during a normal use state was realized by use of a single SR 48 type silver oxide button cell. For a small tablet having one side less than 25 cm, sufficiently accurate and stable digitizing can be obtained by this pen.

Unlike the pierce C-B oscillation circuit, the present circuit provides stable oscillation without any problem even if the resonance circuit connected to the collector of the transistor 75 is inductive or capacitive. Accordingly, even if a little error in frequency of the electromechanical ceramic resonator 67 is at the positive side or the negative side, the resonance frequencies of the output tank circuit 77 and 78 can be adjusted easily (the reactance component of the output circuit 77 and 78 at the frequency of the electromechanical ceramic resonator 67 is adjusted) to correct the oscillation frequency.

Figure 2:
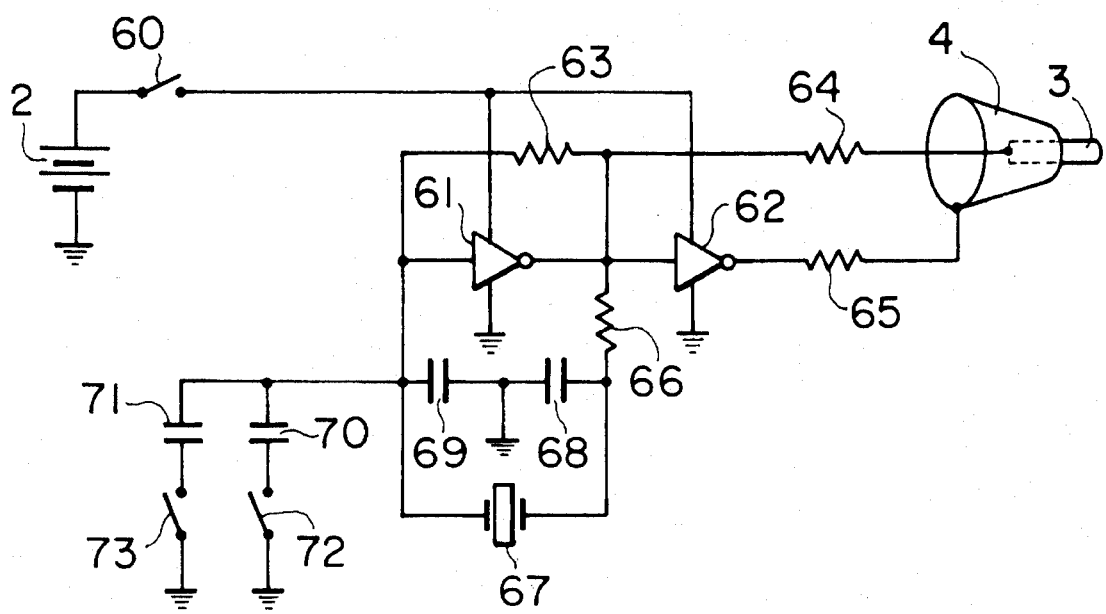
FIG. 2 is a circuit representation of the cordless pen for a large tablet.

In both circuits shown in FIGS. 2 and 3, the maximum frequency shift is 5 kHz so that the frequency band used is narrow, which is greatly contributes to an improvement in S/N ration of the AC signal in the amplitude detection stage. Further, four ways of switch status information are put into the narrow band but highly reliable decoding of switch status can be attained by the frequency stability of the electromechanical ceramic resonator.

Figure 10:
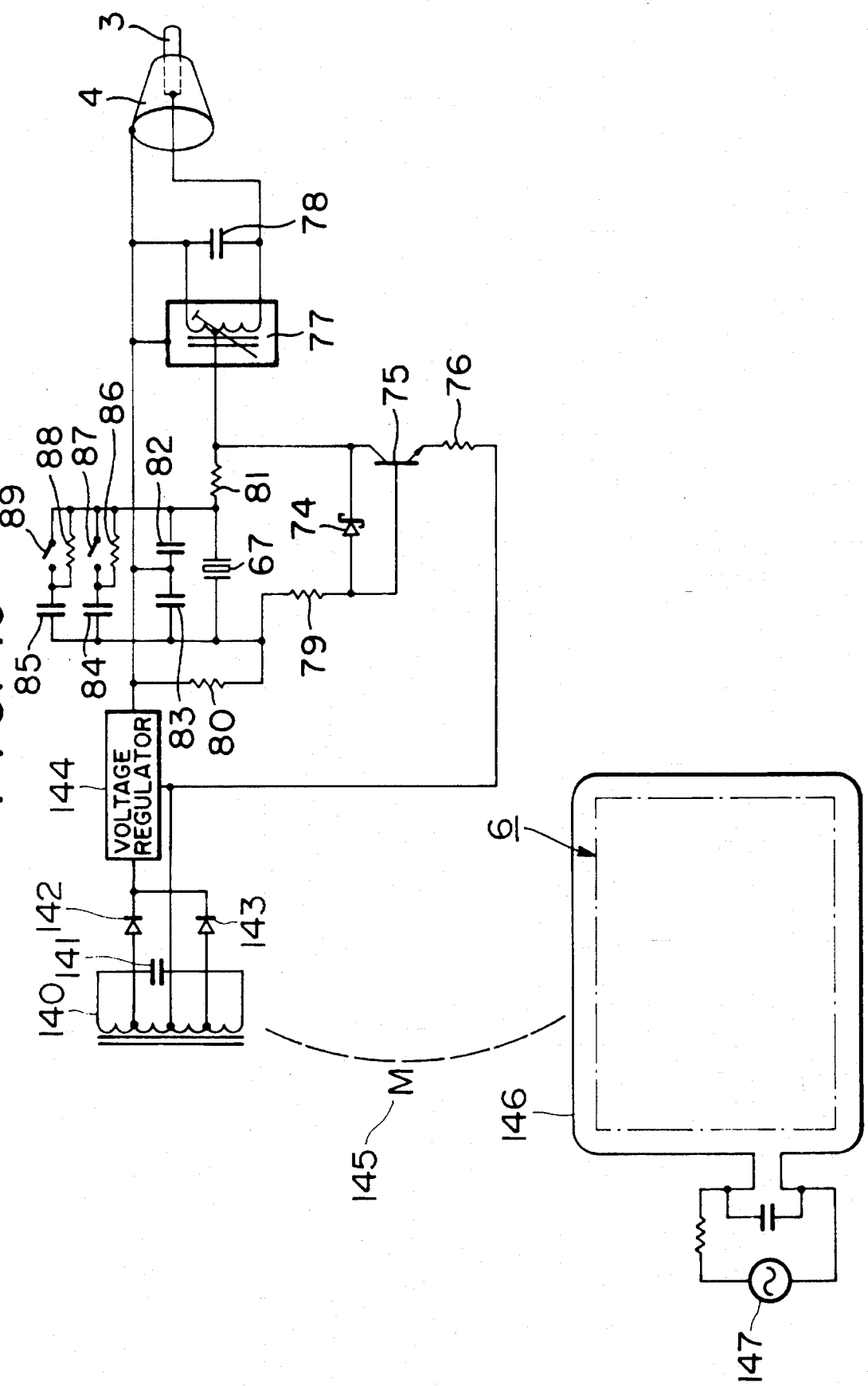
FIG. 10 is a circuit representation of a cordless pen according to the present invention to which a power is supplied by mutual inductance coupling.

In the following, an embodiment of a non-battery pen will be described with reference to FIG. 10. The signal generator circuit in this embodiment is exactly the same as that shown in FIG. 3, description of which is therefore omitted. This embodiment is different from that of FIG. 3 in that a battery is not used as means for supplying a power, but the power is supplied from the coordinate detector apparatus body to a cordless pen. An exciting loop coil 146 is disposed around a digitizing tablet 6. An AC power current is supplied to the exciting coil 146 by an AC power oscillator 147 whose frequency is different from the AC signal generated by the cordless pen. A capacitor arranged in parallel with the exciting loop coil 146 has a function to effect parallel resonance with the exciting loop coil 146 to lower the power loss.

An AC power receiving coil 140 is disposed along the axial direction of a pen axis within the pen, the coil 140 being wound about a rod-like ferrite core. Capacitors 141 are connected to both ends of the AC power receiving coil 140 to constitute a parallel resonance circuit whose resonance frequency is the frequency of the AC power oscillator 147. When the pen is used on the plate surface of the tablet 6, the AC power receiving coil 140 and the exciting loop coil 146 are subjected to mutual inductance coupling indicated at symbol (M) 145 in FIG. 10 to induce a resonance current in the AC power receiving coil 140. A part of this resonance current is removed from taps in the midst of the AC power receiving coil 140 by two rectifying diodes and formed into DC, which is applied to a voltage regulator 144. The voltage regulator 144 supplies DC voltage, e.g. 2.5 V, as a power source, to the AC signal generator circuit. Since the AC signal generator circuit consumes such a low amount of power not experienced in the past, a cordless supply of power as shown in FIG. 10 is realized at low cost.

Figure 11:
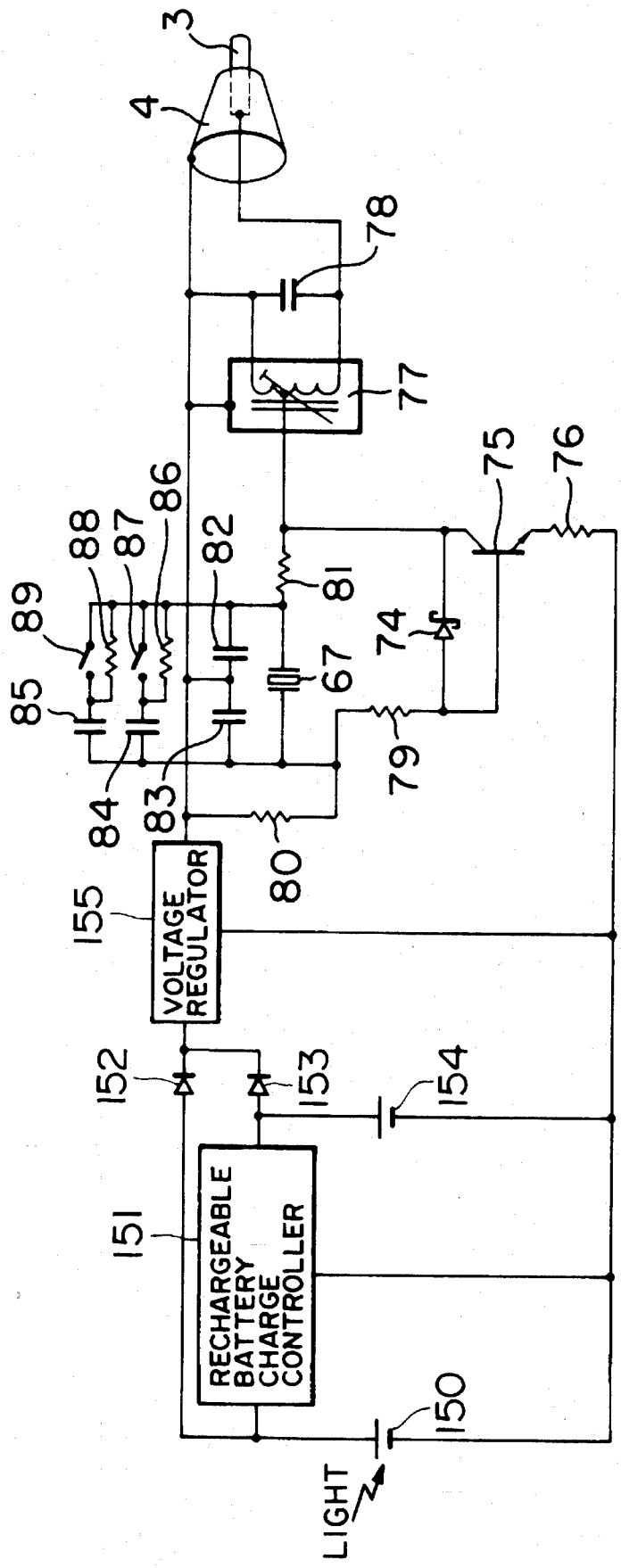
FIG. 11 is a circuit representation of a cordless pen according to the present invention to which a power is supplied by solar battery.

Next, an embodiment of a pen in which the power is supplied by solar battery will be described with reference to FIG. 11. The AC signal generator circuit in this embodiment is exactly the same as that shown in FIG. 3, description of which is therefore omitted. A solar battery 150 is disposed around the upper cylindrical portion of the cordless pen, and power is generated by light during use in an illuminated environment. Most of the output of the solar battery 150 is applied to the voltage regulator 155 through a diode 152. A part of output of the solar battery 150 is applied to a rechargeable battery charge controller 151. The rechargeable battery charge controller 151 charges a rechargeable battery 154 only when the rechargeable battery 154 is not fully charged and when the solar battery 150 generates sufficient power. When the solar battery 150 generates less power, for example, when the pen is behind the light, the rechargeable battery 154 supplies a current to the voltage regulator 155 through a diode 153. The voltage regulator 155 has the same function as that shown in FIG. 10.

While in the foregoing description the conductors at the extreme end of the cordless pen comprise the stylus conductor and the ring-like conductor encircling the stylus conductor, it is to be noted that the present invention is not limited thereto, but the present invention can be realized by the use of two conductors for balanced signal transmission.

I claim:

1. A noiseproof digitizing apparatus, comprising: a tablet having a plurality of grid conductors disposed along X and Y coordinate axes; a cordless pen for transmitting an electric signal to the grid conductors by electrostatic capacity coupling; an AC signal generator disposed within the cordless pen for generating an AC signal and applying an output of the AC signal to the cordless pen; power supplying means for supplying power to the AC signal generator; two conductors disposed at the extreme end of the cordless pen and driven in balance or driven in pseudo balance by the AC signal generator such that electrostatic capacitive coupling between the cordless pen and the grid conductors causes a major balanced AC signal component and two minor unbalanced AC signal components to be produced in the grid conductors in response to the AC signal on the cordless pen; signal level measuring means for measuring the level of a signal current resulting from a sum of the major balanced AC signal and a difference of the two minor unbalanced AC signal components produced in the grid conductors; means for measuring a frequency of the AC signal; and means for processing signal values measured by the signal level measuring means to digitally output a coordinate of the extreme end of the cordless pen.

2. A noiseproof digitizing apparatus according to claim 1; wherein the grid conductors comprise resistive thin film transparent conductors.

3. A noiseproof digitizing apparatus according to claim 1; wherein the cordless pen comprises an output tank circuit comprising a coil connected to the first and second conductors and a resonance capacitor for adjusting a resonance frequency of the AC signal; a C-class operating transistor in which a collector current drives a tap in the midst of the coil; a Schottky-Barrier diode connected from a base toward a collector of the C-class operating transistor; an electromechanical ceramic resonator arranged for non-adjustment oscillation and connected between the collector and the base of the C-class operating transistor through a drive resistor on the collector side; and at least one frequency shift capacitor capable of on/off connection in parallel with the electromechanical ceramic resonator.

4. A noiseproof digitizing apparatus according to claim 3; wherein the power supplying means comprises a cell or a battery.

5. A noiseproof digitizing apparatus according to claim 3; wherein the power supplying means produces regulated DC power which is generated from AC power induced by mutual inductance coupling between a receiving coil in the cordless pen and an exciting coil embedded in the tablet.

6. A noiseproof digitizing apparatus according to claim 3; wherein the power supplying means comprises a regulated DC power supply powered by a solar cell or a solar battery.

7. A noiseproof digitizing apparatus according to claim 1; wherein the AC signal generator comprises in-phase and reverse-phase drivers of a squarewave oscillator.

8. A noiseproof digitizing apparatus according to claim 1; wherein the means for measuring a frequency of the AC signal comprises means for generating a clock pulse having the same frequency as that of said AC signal, the frequency of the clock pulse being divided by two to form a squarewave which is digitally counted to calculate a frequency of the AC signal.

9. A noiseproof digitizing apparatus according to claim 1; wherein the signal level measuring means is one in which an AC voltage to be measured and converted from the signal current and an output voltage of a continuous near-squarewave generator synchronized in phase with the AC voltage to be measured are superimposed, AM envelope detection is used, and a non-signal level and a drift are automatically canceled by a cancel circuit composed of two operational amplifiers and sample/holder of the non-signal level.

10. A noiseproof digitizing apparatus according to claim 1; further comprising interpolation means for interpolating a coordinate between the grid conductors, wherein an approximate interpolation amount is obtained which is further corrected by a correction table, if necessary, as follows:

in a half interpolation section on the lower side, X being the approximate interpolation amount, $$X=(d/2)*(1-B/A)$$

in a half interpolation section on the upper side, $$X=(d/2)*(B/C)$$

wherein d: distance between two adjacent grid conductors in the tablet,

A: measured signal level by nth and n+1th grid conductors, n being a suitable positive integer, B: measured signal level by n+1th and n+2th grid conductors, and C: measured signal level by n+2th and n+3th grid conductors.

11. A noiseproof digitizing apparatus according to claim 1; further comprising interpolation means for interpolating a coordinate between the grid conductors, wherein an approximate interpolation amount is obtained which is further corrected by a correction table, if necessary, as follows:

in a half interpolation section on the lower side, X being the approximate interpolation amount, $$X=d*(A-B)/(A+C) \ldots \text{(when } B \geq C\text{)}$$

$$X=d*\{1-[A(3C-B)+(B+C)(2B-C]/(A+C)^2\} \ldots \text{(when } B>C\text{)}$$

in a half interpolation section on the upper side, $$X=d*(\tfrac{1}{2}(C-B)/(A+C) \ldots \text{(when } B \geq A\text{)}$$

$$X=d*\{[C(3A-B)+(A+B)(2B-A)]/(A+C)^2-1/2 \ldots \text{(when } B<A\text{)}$$

wherein d: distance between adjacent grid conductors in the tablet,

A: measured signal level by nth and n+1th grid conductors, n being a suitable positive integer, B: measured signal level by n+1th and n+2th grid conductors, and C: measured signal level by n+2th and n+3th grid conductors.

12. A noiseproof digitizing apparatus for digitizing coordinates of a point on a tablet having grid conductors disposed along X and Y coordinate axes, the noiseproof digitizing apparatus comprising:

a cordless pen having a conductive end for transmitting an electrical signal to the grid conductors by electrostatic capacitive coupling, and AC signal generating means for generating an AC signal and applying a balanced output of the AC signal to the conductive end such that electrostatic capacitive coupling between the conductive end and the grid conductors causes a major balanced AC signal component and two minor unbalanced AC signal components to be produced in the grid conductors in response to the AC signal on the conductive end;

power supplying means for supplying electrical power to the AC signal generating means;

signal level measuring means for measuring the level of a signal current resulting from a sum of the major balanced AC signal component and the two minor unbalanced AC signal components produced in the grid conductors; and means for processing the signal current level measured by the signal level measuring means to determine a coordinate of the conductive end of the cordless pen.

13. A noiseproof digitizing apparatus as recited in claim 12; further comprising means for effecting current to voltage conversion of the signal current, wherein the means for processing processes measured values of converted voltages to digitally output a coordinate of the conductive end of the cordless pen; and means for measuring a frequency of the signal current.

14. A noiseproof digitizing apparatus as recited in claim 13; wherein the conductive end of the cordless pen comprises a first conductor and a second conductor disposed coaxially about and spaced from the first conductor, wherein the AC signal generating means applies an AC signal between the first and second conductors.

15. A noiseproof digitizing apparatus according to claim 14; wherein the grid conductors comprise thin film transparent resistive conductors.

16. A noiseproof digitizing apparatus according to claim 14; wherein the cordless pen comprises an output tank circuit comprising a coil connected to the first and second conductors and a resonance capacitor for adjusting a resonance frequency of the AC signal;

a C-class operating transistor in which a collector current drives a tap of the coil;

a Schottky-Barrier diode connected from a base toward a collector of the C-class operating transistor;

an electro-mechanical ceramic resonator connected between the collector and the base of the C-class operating transistor through a drive resistor on the collector side; and at least one frequency shift capacitor capable of on/off connection in parallel with the electro-mechanical ceramic resonator.

17. A noiseproof digitizing apparatus according to claim 16; wherein the power supplying means is disposed within the cordless pen and comprises a cell or a battery.

18. A noiseproof digitizing apparatus according to claim 16; wherein the power supplying means pen produces regulated DC power which is generated from AC power induced by mutual inductance coupling between a receiving coil in the cordless pen and an exciting coil embedded in the tablet.

19. A noiseproof digitizing apparatus according to claim 16; wherein the power supplying means is disposed within the cordless pen and comprises a regulated DC power supply powered by a solar cell or a solar battery.

20. A noiseproof digitizing apparatus according to claim 16; wherein the AC signal generating means comprises in-phase and reverse-phase drivers of a squarewave oscillator.

21. A noiseproof digitizing apparatus according to claim 12; wherein the means for measuring a frequency of the AC signal comprises means for generating a clock pulse having the same frequency as that of said AC signal, the frequency of the clock pulse being divided by two to form a squarewave which is digitally counted to calculate a frequency of the AC signal.

22. A noiseproof digitizing apparatus according to claim 12; wherein the signal level measuring means is one in which an AC voltage to be measured and converted from the signal current and an output voltage of a continuous near-squarewave generator synchronized in phase with the AC voltage to be measured are superimposed, AM envelope detection is used, and a non-signal level and a drift are automatically canceled by a cancel circuit composed of two operational amplifiers and sample/holder of the non-signal level.

23. A noiseproof digitizing apparatus according to claim 12; further comprising interpolation means for interpolating a coordinate between the grid conductors, wherein an approximate interpolation amount is obtained which is further corrected by a correction table, if necessary, as follows:

in a half interpolation section on the lower side, X being the approximate interpolation amount, $$X=(d/2)*(1-B/A)$$

in a half interpolation section on the upper side, $$X=(d/2)*(B/C)$$

wherein d: distance between two adjacent grid conductors in the tablet,

A: measured signal level by nth and n+1th grid conductors, n being a suitable positive integer, B: measured Signal level by n+1th and n+2th grid conductors, and C: measured signal level by n+2th and n+3th grid conductors.

24. A noiseproof digitizing apparatus according to claim 12; further comprising interpolation means for interpolating a coordinate between the grid conductors, wherein an approximate interpolation amount is obtained which is further corrected by a correction table, if necessary, as follows:

in a half interpolation section on the lower side, X being the approximate interpolation amount, $$X=d*(A-B)/(A+C) \ldots \text{(when } B \geq C)$$

$$X=d*\{1-[A(3C-B)+(B+C)(2B-C)]/(A+C)^2\} \ldots \text{(when } B<C)$$

in a half interpolation section on the upper side, $$X=d*(\tfrac{1}{2}-(C-B)/(A+C)) \ldots \text{(when } B \geq A)$$

$$X=d*\{[C(3A-B)+(A+B)(2B-A)]/(A+C)^2 -1/2\} \ldots \text{(when } B<A)$$

wherein d: distance between adjacent grid conductors in the tablet,

A: measured signal level by nth and n+1th grid conductors, n being a suitable positive integer, B: measured signal level by n+1th and n+2th grid conductors, and C: measured signal level by n+2th and n+3th grid conductors.

* * * * *